(12) United States Patent
Sawada

(10) Patent No.: US 9,585,086 B2
(45) Date of Patent: Feb. 28, 2017

(54) MOBILE STATION DEVICE FOR REDUCING PROCESSING TIME AND POWER CONSUMPTION RELATED TO A CELL SEARCH

(71) Applicant: Sharp Kabushiki Kaisha, Osaka-shi, Osaka (JP)

(72) Inventor: Shinichi Sawada, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/422,798

(22) PCT Filed: Feb. 6, 2014

(86) PCT No.: PCT/JP2014/052789
§ 371 (c)(1),
(2) Date: Feb. 20, 2015

(87) PCT Pub. No.: WO2014/125996
PCT Pub. Date: Aug. 21, 2014

(65) Prior Publication Data
US 2015/0223153 A1    Aug. 6, 2015

(30) Foreign Application Priority Data

Feb. 15, 2013  (JP) ................... 2013-028189

(51) Int. Cl.
| | |
|---|---|
| H04W 48/16 | (2009.01) |
| H04W 52/02 | (2009.01) |
| H04W 24/08 | (2009.01) |
| H04W 56/00 | (2009.01) |
| H04W 72/04 | (2009.01) |
| H04W 28/18 | (2009.01) |
| H04W 4/02 | (2009.01) |
| H04W 72/02 | (2009.01) |

(52) U.S. Cl.
CPC ............. *H04W 48/16* (2013.01); *H04W 4/02* (2013.01); *H04W 24/08* (2013.01); *H04W 28/18* (2013.01);
(Continued)

(58) Field of Classification Search
CPC ... H04W 48/16; H04W 52/0245; H04W 4/02; H04W 28/18; H04W 72/02;
(Continued)

(56) References Cited

U.S. PATENT DOCUMENTS

2003/0232631 A1* 12/2003 Ohmori ................. H04W 8/18
                                                                455/552.1
2008/0057959 A1   3/2008 Ida et al.
(Continued)

FOREIGN PATENT DOCUMENTS

| JP | 2004-023391 A | 1/2004 |
|---|---|---|
| JP | 2004-357214 A | 12/2004 |

(Continued)

OTHER PUBLICATIONS

Official Communication issued in International Patent Application No. PCT/JP2014/052789, mailed on Apr. 8, 2014.

*Primary Examiner* — Ian N Moore
*Assistant Examiner* — Lakeram Jangbahadur
(74) *Attorney, Agent, or Firm* — Keating & Bennett, LLP

(57) ABSTRACT

A detection threshold changing unit changes a detection threshold used for detecting a reception wave from a base station apparatus, on the basis of use environment information that represents a use environment of a mobile station apparatus. A channel selecting unit selects a channel having a reception level higher than the detection threshold from among channels that constitute the reception wave. A synchronization processing unit performs a synchronization process on a reception wave of the channel selected by the channel selecting unit. In this way, the processing time and power consumption related to a cell search is reduced.

4 Claims, 22 Drawing Sheets

(52) U.S. Cl.
CPC ... *H04W 52/0229* (2013.01); *H04W 52/0245* (2013.01); *H04W 56/00* (2013.01); *H04W 72/0453* (2013.01); *H04W 72/02* (2013.01)

(58) Field of Classification Search
CPC ............. H04W 52/0229; H04W 24/08; H04W 72/0453; H04W 56/00
See application file for complete search history.

(56) References Cited

U.S. PATENT DOCUMENTS

| | | | |
|---|---|---|---|
| 2009/0131047 A1* | 5/2009 | Amerga | H04W 48/16 455/434 |
| 2010/0034097 A1 | 2/2010 | Nitta et al. | |
| 2010/0105381 A1* | 4/2010 | Takeda | H04W 36/0061 455/434 |
| 2010/0261496 A1* | 10/2010 | Fukumoto | H04W 48/16 455/517 |

FOREIGN PATENT DOCUMENTS

| | | | | |
|---|---|---|---|---|
| JP | 2005-045730 | * | 2/2005 | ............... H04B 7/26 |
| JP | 2005-045730 A | | 2/2005 | |
| JP | 2006-352822 A | | 12/2006 | |
| JP | 2007-020049 A | | 1/2007 | |
| JP | 2008-211680 A | | 9/2008 | |
| JP | 2009-239464 | * | 10/2009 | ............ H04W 52/02 |
| JP | 2009-239464 A | | 10/2009 | |
| JP | 2010-539858 A | | 12/2010 | |
| WO | 2008/108252 A1 | | 9/2008 | |
| WO | 2008/129716 A1 | | 10/2008 | |
| WO | 2009/069631 A1 | | 6/2009 | |

\* cited by examiner

FIG. 4

| COUNTRY INFORMATION | DETECTION THRESHOLD INFORMATION (dBm) |
|---|---|
| AC, BC | D |
| OTHERS | E |

FIG. 5

| BASE STATION INFORMATION | COUNTRY INFORMATION | COMMUNICATION OPERATOR INFORMATION | FREQUENCY BAND INFORMATION |
|---|---|---|---|
| BASE STATION APPARATUS 11 | X | XOP | XBW |
| BASE STATION APPARATUS 12 | Y | YOP | YBW |

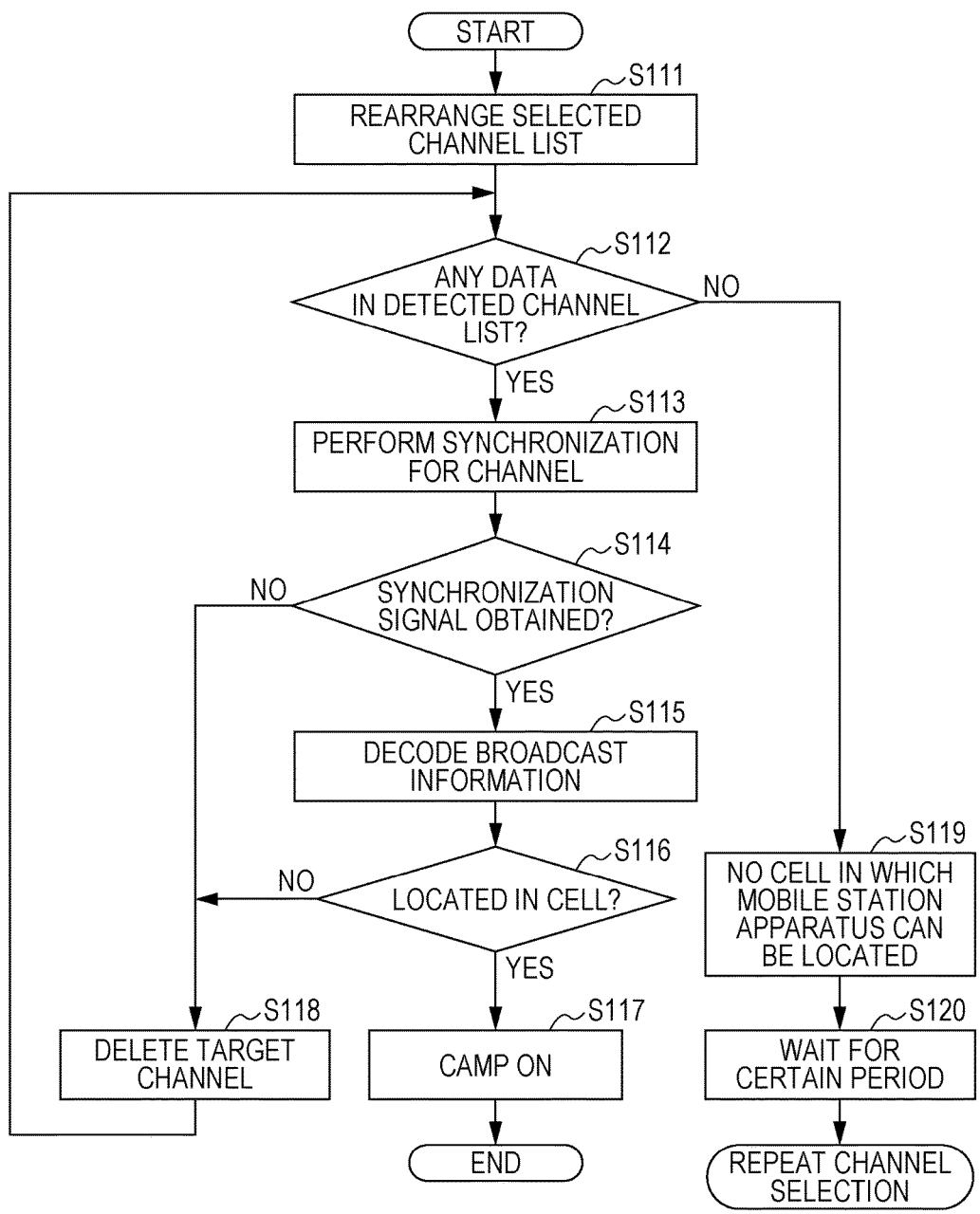

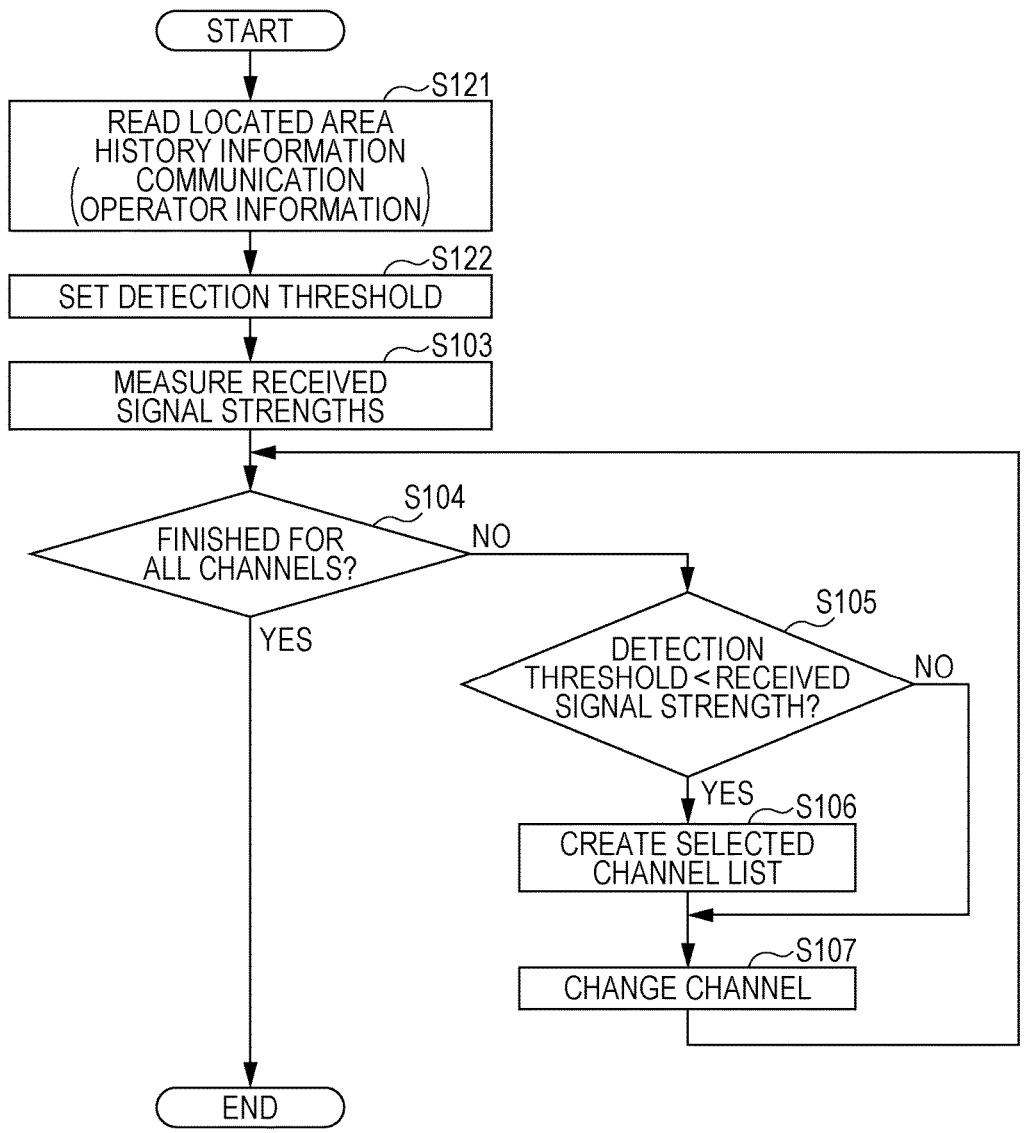

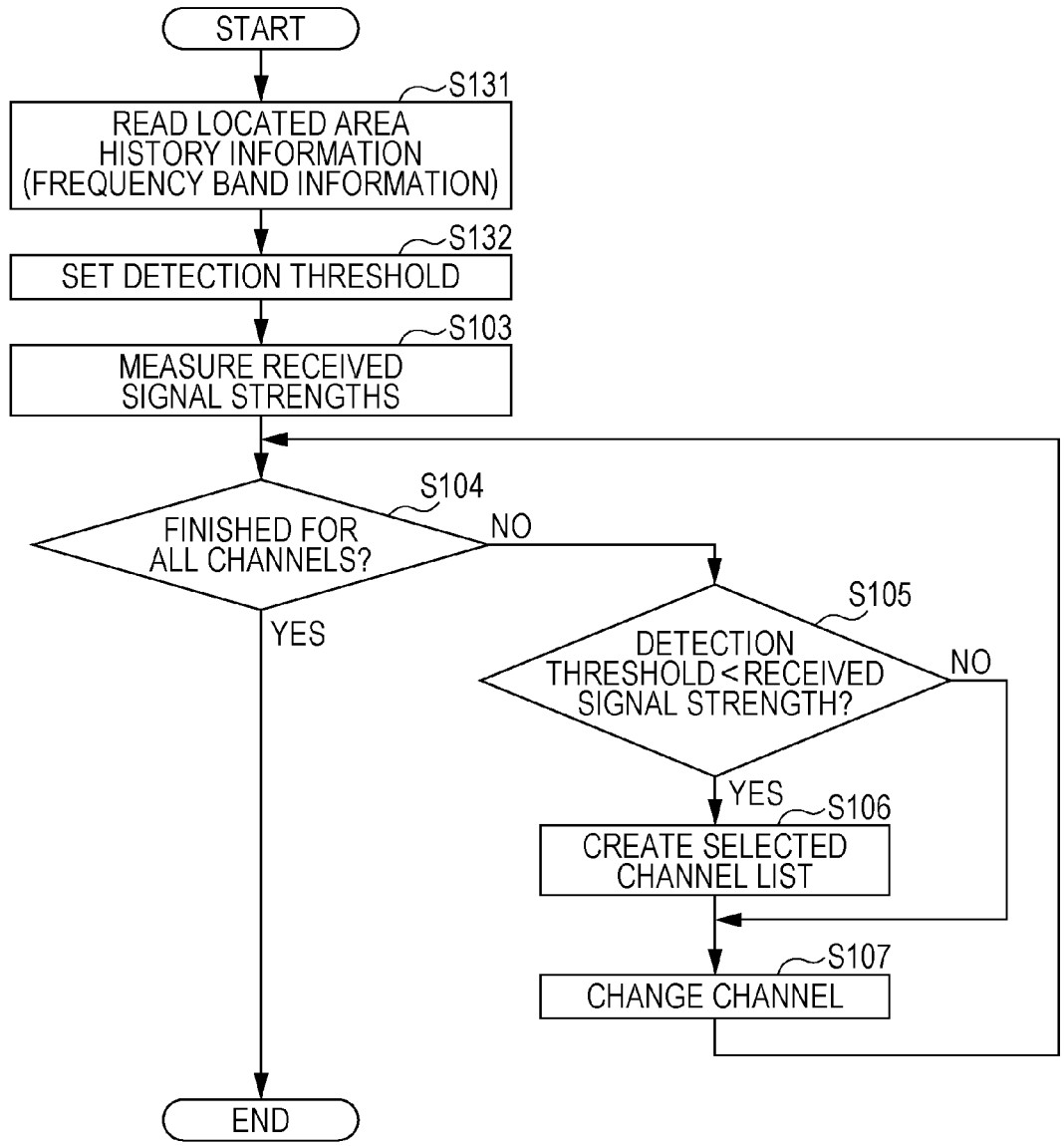

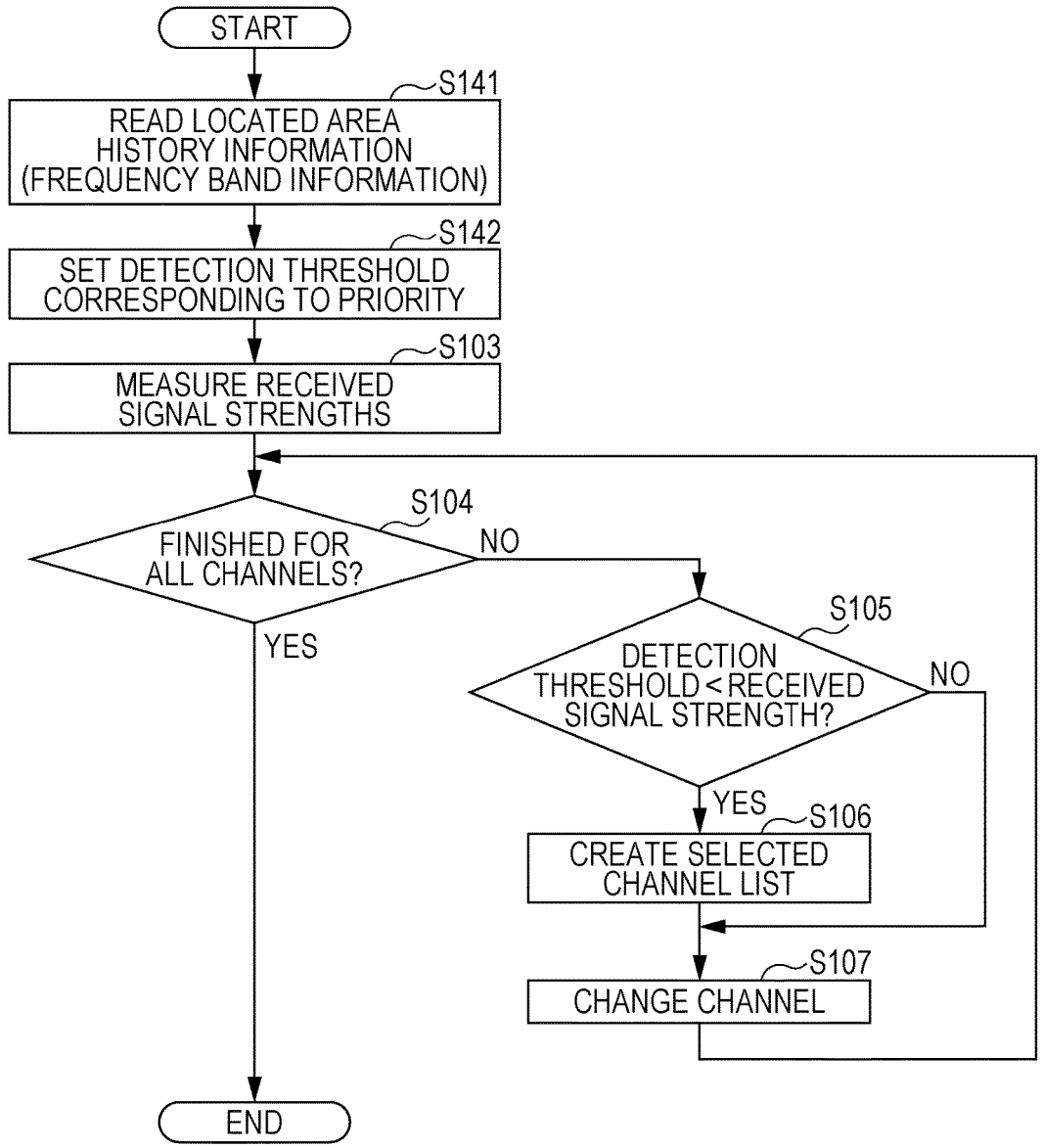

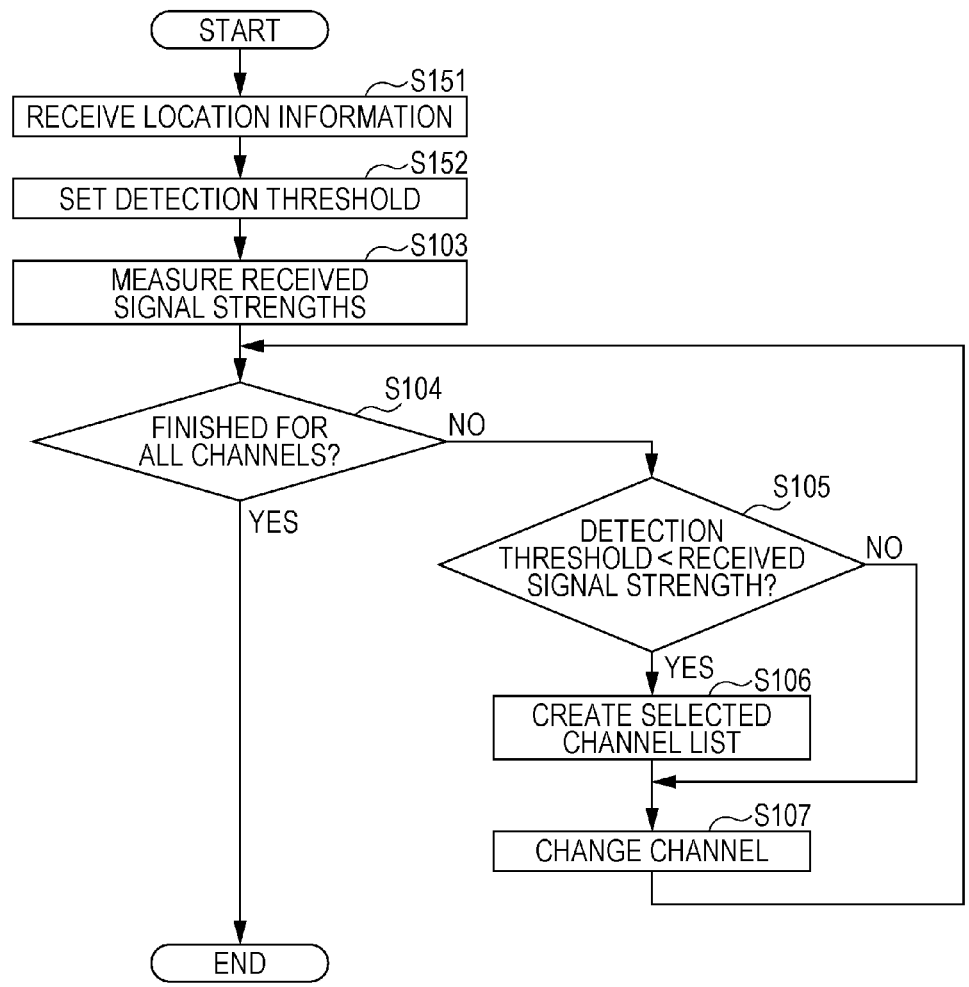

FIG. 30
| VOLTAGE (V) | DETECTION THRESHOLD INFORMATION (dBm) |
|---|---|
| V1< | D |
| V2< | F |
| OTHERS | E |
FIG. 31
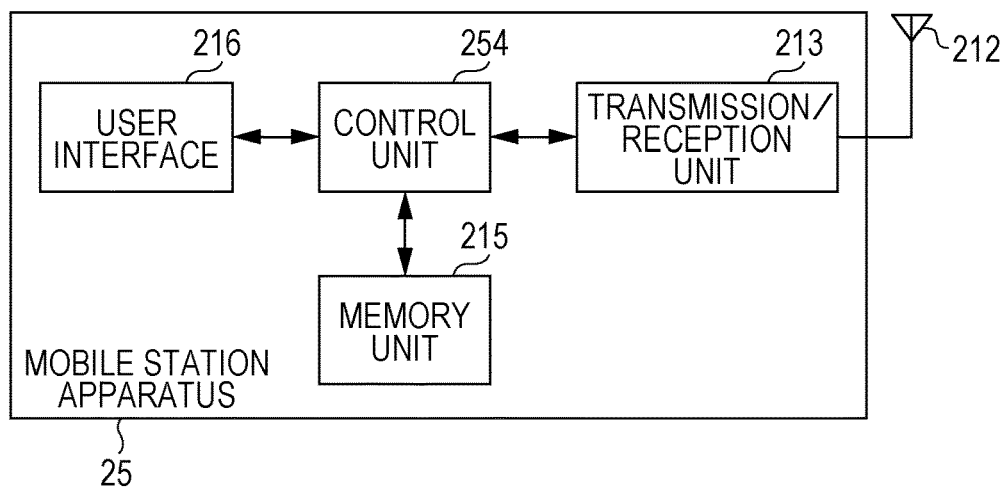
FIG. 32
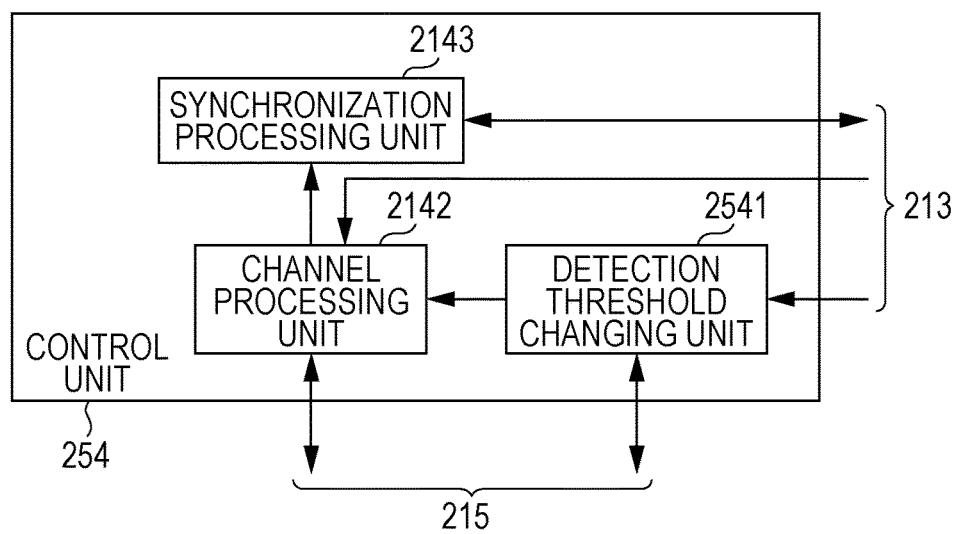

MOBILE STATION DEVICE FOR REDUCING PROCESSING TIME AND POWER CONSUMPTION RELATED TO A CELL SEARCH

TECHNICAL FIELD

The present invention relates to a mobile station apparatus, an integrated circuit, a communication method, and a communication program.

This application claims priority of Patent Application No. 2013-028189 filed in Japan on Feb. 15, 2013, the entire contents of which are incorporated herein by reference.

BACKGROUND ART

Due to the widespread use of wireless communication with mobile phones or the like, it is desired that the finite frequency resources be utilized by as many users as possible. In wireless communication systems for mobile phones, a plurality of base station apparatuses are connected to one another mainly by wires. Also, each of the base station apparatuses is wirelessly connected to mobile station apparatuses used by users. Although an area in which communication can be performed in wireless communication systems is limited to a range (cell) over which a radio wave reaches from each base station apparatus, arranging a plurality of base station apparatuses at different locations makes it possible to perform communication at locations within a wide range. Also, wireless communication systems of different cell arrangements or different frequency bands may be used depending on countries in which the systems are operated, carriers, communication services, or the like.

On the other hand, a mobile station apparatus may be moved to outside of a range of an area (cell) over which a radio wave reaches from a base station apparatus (to an out-of-service area). The mobile station apparatus performs processing (cell search) for searching for a base station apparatus which the mobile station apparatus can communicate with in order to become able to perform communication in the out-of-service area. The cell search is mainly composed of measurement of a reception strength and a synchronization process. After a successful cell search, the mobile station apparatus becomes able to communicate with other mobile station apparatuses.

During a cell search performed in an out-of-service area (for example, a cell search performed in response to movement from Japan to Europe), the mobile station apparatus measures the reception strength on all receivable channels in an available communication system and then performs a synchronization process in general. For this reason, the cell search has drawbacks in that it requires a long time and increases the power consumption.

Accordingly, in a communication method described in PTL 1, (1) in the case where a mobile station apparatus capable of utilizing communication systems A and B is in an out-of-service area of the communication systems, a conventional cell search (cell search for all channels) is performed as planned; (2) upon discovering, for example, a base station of the system A during the cell search, the mobile station apparatus obtains a country code (MCC: Mobile Country Code) from broadcast information, and searches lists stored in a main body storage section and an external storage section for whether or not a frequency that meets a combination of the country code and an operator is stored in the lists; and (3) if such a frequency is stored, for example, for the system B, the mobile station apparatus performs a cell search for the search-target frequency. In the case where the system B is not stored, the mobile station apparatus does not perform a cell search. As described above, the search-target frequency is limited to the frequency used by an operator that provides a communication service in that country prior to the cell search, whereby an unnecessary cell search for obtaining broadcast information of an operator that does not provide a communication service is omitted.

CITATION LIST

Patent Literature

PTL 1: Japanese Unexamined Patent Application Publication No. 2004-23391

SUMMARY OF INVENTION

Technical Problem

In the communication method according to PTL 1, a cell search may be restricted even in a frequency band that is made available to a mobile station apparatus, such as a mobile phone. For example, there is a problem in that, in the case where a frequency band that is in operation is changed to a cell-search restricted frequency band at a certain time point, a cell search is not performed and consequently communication is disabled. The communication method according to PTL 1 also involves a problem in that, in the case where it is determined that a cell search is to be performed using stored history information, many reception waves due to noise or weak interfering waves of frequency bands that are not in operation are detected and an unnecessary synchronization process is performed.

The present invention has been made in view of the above-described problems, and provides a mobile station apparatus, an integrated circuit, a communication method, and a communication program that reduce the processing time and power consumption related to a cell search.

Solution to Problem

The present invention has been made in order to solve the above-described problems, and one aspect of the present invention is a mobile station apparatus including a detection threshold changing unit configured to change a detection threshold used for detecting a reception wave from a base station apparatus, on the basis of use environment information that represents a use environment of the mobile station apparatus; a channel selecting unit configured to select a channel having a reception level higher than the detection threshold from among channels that constitute the reception wave; and a synchronization processing unit configured to perform a synchronization process on a reception wave of the channel selected by the channel selecting unit.

Advantageous Effects of Invention

According to each aspect of the present invention, the processing time and power consumption related to a cell search can be reduced.

BRIEF DESCRIPTION OF DRAWINGS

FIG. 4 is a diagram illustrating an example of detection-threshold correspondence information according to the present embodiment.

FIG. 5 is a diagram illustrating an example of located area history information according to the present embodiment.

FIG. 8 is a flowchart illustrating a synchronization process according to the present embodiment.

FIG. 9 is a diagram illustrating an example of detection-threshold correspondence information according to a modification 1-1 of the present embodiment.

FIG. 10 is a flowchart illustrating a channel selection process according to the present modification.

FIG. 11 is a diagram illustrating an example of detection-threshold correspondence information according to a modification 1-2 of the present embodiment.

FIG. 12 is a flowchart illustrating a channel selection process according to the present modification.

FIG. 14 is a diagram illustrating an example of detection-threshold correspondence information according to a modification 1-3 of the present embodiment.

FIG. 15 is a flowchart illustrating a channel selection process according to the present modification.

FIG. 19 is a diagram illustrating an example of detection-threshold correspondence information according to the present embodiment.

FIG. 20 is a flowchart illustrating a channel selection process according to the present embodiment.

FIG. 30 is a diagram illustrating another example of detection-threshold correspondence information according to the present embodiment.

FIG. 31 is a schematic block diagram illustrating a configuration of a mobile station apparatus according to a fourth embodiment of the present invention.

FIG. 32 is a schematic block diagram illustrating a configuration of a control unit according to the present embodiment.

DESCRIPTION OF EMBODIMENTS

First Embodiment

Embodiments of the present invention will be described below with reference to the drawings.

Figure 1:
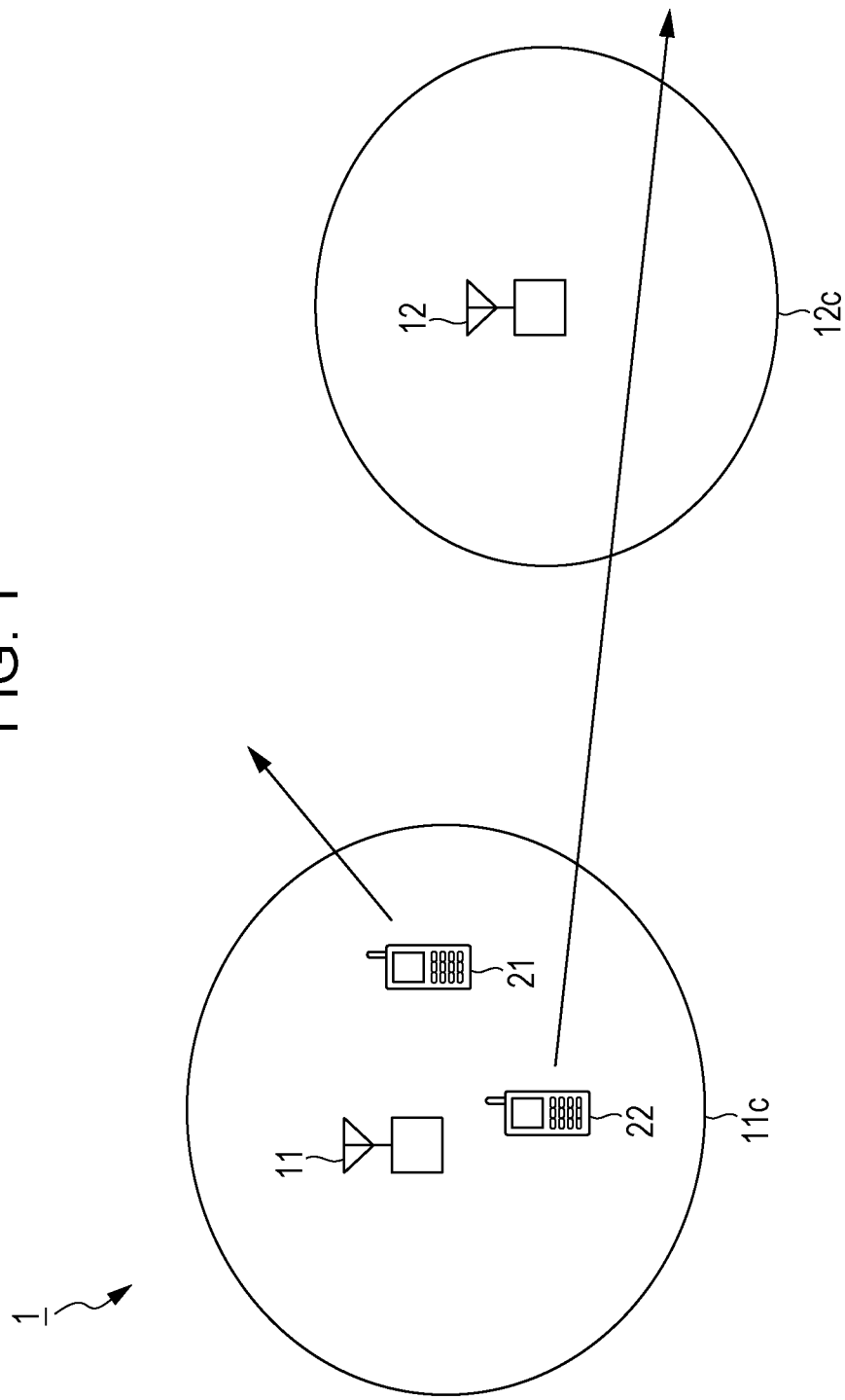
FIG. 1 is a conceptual diagram illustrating a communication system according to a first embodiment of the present invention.

FIG. 1 is a conceptual diagram illustrating a communication system 1 according to the present embodiment.

The communication system 1 includes a plurality of (two in an example illustrated in FIG. 1) base station apparatuses 11 and 12 and a plurality of (two in the example illustrated in FIG. 1) mobile station apparatuses 21 and 22.

The base station apparatuses 11 and 12 are apparatuses that transmit and receive signals using radio waves between a core network (CN, not illustrated) and the mobile station apparatuses 21 and 22 located within cells 11c and 12c. The base station apparatuses 11 and 12 each may be simply referred to as an eNB (evolved Node B). The cells 11c and 12c are areas in which the base station apparatuses 11 and 12, respectively, are capable of transmitting and receiving signals to and from the mobile station apparatuses 21 and 22 using radio waves. The base station apparatuses 11 and 12 are arranged at different locations.

The base station apparatuses 11 and 12 may be either large-scale base station apparatuses (macrocells) or small-scale base station apparatuses (for example, microcells, picocells, or femtocells). A macrocell refers to the cell 11c or 12c having a radius of approximately several hundreds of meters to approximately several kilometers, or a base station apparatus having such a cell. A microcell refers to the cell 11c or 12c having a radius of approximately several tens of meters to approximately several hundreds of meters, or a base station apparatus having such a cell. A picocell refers to the cell 11c or 12c having a radius of approximately several meters to approximately several tens of meters, or a base station apparatus having such a cell. A femtocell refers to the cell 11c or 12c having a radius of approximately several meters or smaller, or a base station apparatus having such a cell. The femtocell is also referred to as a home base station apparatus (HeNB: Home eNodeB). Accordingly, the cells 11c and 12c and the like connected to one network form a service area in which communication can be performed using the network.

A network connected to the base station apparatuses 11 and 12 and the like is, for example, a PLMN (Public Land Mobile Network, public wireless communication network). A PLMN is a network in which a communication carrier provides communication services to users (subscribers). The adopted communication scheme and frequency band, the connected base station apparatuses 11 and 12, and so forth may differ from country to country in which or from carrier to carrier by which the network is operated. The communication scheme is, for example, LTE (Long Term Evolution), LTE-A (LTE-Advanced), W-CDMA (Wideband Code Division Multiple Access), GSM (registered trademark) (Global System for Mobile Communications), or the like.

Each of the mobile station apparatuses 21 and 22 is an apparatus that realizes communication with its communication partner by transmitting and receiving signals using radio waves via the base station apparatus 11 or 12. The mobile station apparatuses 21 and 22 are also referred to as terminal apparatuses or user equipments (UEs). The mobile station apparatuses 21 and 22 are, for example, mobile phones, multifunction mobile phones (including so-called smartphones), tablet terminal apparatuses, or the like.

A service area does not necessarily occupy the entire space, as illustrated in FIG. 1. The mobile station apparatuses 21 and 22 may be unable to receive signals from the base station apparatuses 11 and 12 because of arrangement of the base station apparatuses 11 and 12, output of radio waves thereof, arrangement of buildings and other obstacles, noise sources, or the like.

An arrow originating from the mobile station apparatus 21 indicates that the mobile station apparatus 21 is originally located at a location belonging to the cell 11c, and then is moved to outside of the service area including the cell 11c (to an out-of-service area). On the other hand, an arrow originating from the mobile station apparatus 22 indicates that the mobile station apparatus 22 is originally located at a location belonging to the cell 11c, and then is moved sequentially to the out-of-service area, the cell 12c, and the out-of-service area. The mobile station apparatuses 21 and 22 search (perform a cell search) for the base station apparatus 11 or 12 related to a cell to which the mobile station apparatuses 21 and 22 belong (in which they are located) during booting or in a state in which the mobile station apparatuses 21 and 22 are once located in the out-of-service area and become unable to perform communication. As a result of a successful search, the mobile station apparatuses 21 and 22 become able to communicate with the base station apparatus 11 or 12.

(Configuration of Mobile Station Apparatus)

Next, a configuration of the mobile station apparatus 21 according to the present embodiment will be described. The mobile station apparatus 22 has a configuration similar to that of the mobile station apparatus 21, and thus a description regarding the mobile station apparatus 21 is incorporated herein by reference. In the following description, a case where the mobile station apparatus 21 performs communication mainly using the base station apparatus 11 is used as an example; however, the present embodiment is not limited to this example, and the mobile station apparatus 21 may use another base station apparatus, for example, the base station apparatus 12.

Figure 2:
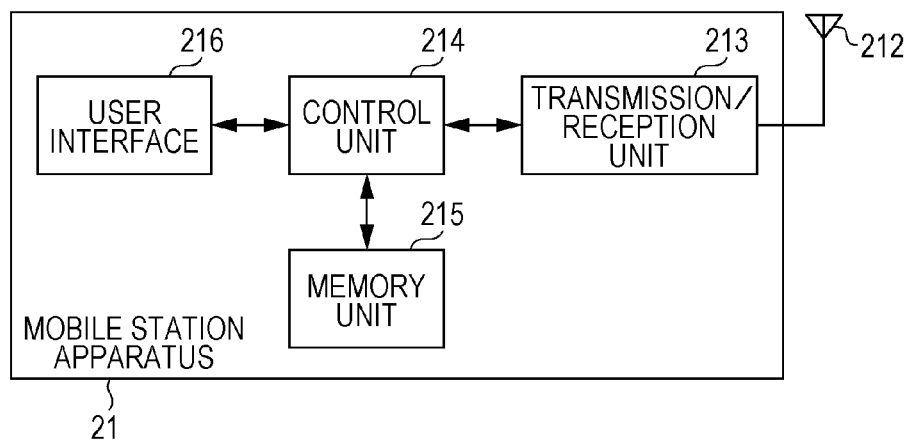
FIG. 2 is a schematic block diagram illustrating a configuration of a mobile station apparatus according to the present embodiment.

FIG. 2 is a schematic block diagram illustrating a configuration of the mobile station apparatus 21 according to the present embodiment.

The mobile station apparatus 21 includes an antenna 212, a transmission/reception unit 213, a control unit 214, a memory unit (storage unit) 215, and a user interface 216.

The antenna 212 receives a reception wave from the base station apparatus 11, that is, a receive signal of a radio frequency band that has reached it in a form of a radio wave, and outputs the received signal to the transmission/reception unit 213. The antenna 212 transmits a transmit signal of a radio frequency band input thereto from the transmission/reception unit 213 to the base station apparatus 11 in a form of a radio wave.

The transmission/reception unit 213 converts the received signal of the radio frequency band input thereto from the antenna 212 into a received signal of a base frequency band, and outputs the resulting received signal to the control unit 214. The transmission/reception unit 213 converts a transmit signal of a base frequency band input thereto from the control unit 214 into a transmit signal of a radio frequency band, and outputs the resulting transmit signal to the antenna 212.

Also, the transmission/reception unit 213 measures, for each channel, a reception level (received signal strength, RSSI: Received Signal Strength Indicator) received from the base station apparatus 11. The transmission/reception unit 213 outputs received signal strength information representing the received signal strength measured for each channel to the control unit 214. Here, a channel indicates a frequency or frequency band that constitutes a radio wave used for communication, and a frequency or frequency band serving as units of data allocation. For example, in the GSM (registered trademark) scheme, individual channels are allocated at intervals of 200 kHz. Also, in the LTE scheme, channels are also referred to as subcarriers, and a bandwidth of one channel is 15 kHz. In the LTE scheme, a plurality of (for example, approximately 600 in the case where the bandwidth is 10 MHz) channels are used for communication between the mobile station apparatus 21 and the base station apparatus 11.

The following description employs the case of mainly using the received signal strength (RSSI) as an index of the reception level as an example; however, in the present embodiment, an index of the reception level such as RSRP (Reference Signal Received Power) or RSRQ (Reference Signal Received Quality) may be used.

The control unit 214 controls processes performed by the mobile station apparatus 21. The control unit 214 controls, for example, inputting of a received signal from the transmission/reception unit 213 and outputting of a transmit signal to the transmission/reception unit 213.

The control unit 214 outputs, to the user interface 216, user data among the received signal input thereto from the transmission/reception unit 213; and outputs, to the transmission/reception unit 213, user data input thereto from the user interface 216 as a transmit signal. Here, user data is a signal that is transmitted or received by the mobile station apparatus 22 serving as a communication partner, and is, for example, an audio signal, a video signal, or text data.

The control unit 214 controls starting or stopping of a process, changing of a mode, or the like in accordance with an operation input signal input thereto from the user interface 216; and outputs the obtained image signal, text signal, or the like to the user interface 216. The control unit 214 sometimes uses data read from the memory unit 215 when it processes. Also, the control unit 214 stores data generated through a process in the memory unit 215. The control unit 214 determines that the mobile station apparatus is located in an out-of-service area in the case where the received signal strength is equal to a predetermined detection threshold (for example, −120 (dBm)) or lower than the detection threshold in all the receivable frequency bands, for example. The control unit 214 determines that the mobile station apparatus is located within the area of the cell 11c in the case where the received signal strength exceeds the detection threshold. A more detailed configuration of the control unit 214 will be described later.

The memory unit 215 pre-stores data used in processes performed by the control unit 214, for example, detection threshold information representing a detection threshold used for detecting a frequency band of a received signal. Also, the memory unit 215 stores data obtained by the control unit 214. In the following description, the detection threshold information may be simply referred to as a detection threshold.

The user interface 216 presents, to the user, information based on the received signal input thereto from the control unit 214; and outputs, to the control unit 214, information accepted from the user.

For example, the user interface 216 causes a sound reproduction unit (for example, a speaker, not illustrated) to reproduce sound based on an audio signal input thereto from the control unit 214; and outputs an audio signal of sound recorded by a sound collecting unit (for example, a microphone, not illustrated) to the control unit 214.

Also, the user interface 216 causes an image display unit (for example, a display, not illustrated) to display an image represented by an image signal input thereto from the control unit 214; and outputs an image signal representing an image captured by an image capturing unit (for example, a camera, not illustrated) to the control unit 214.

The user interface 216 outputs an operation input signal corresponding to a user input operation detected by an operation input unit (for example, a touch sensor, not illustrated) to the control unit 214. The operation input unit and the image display unit may be integrated into a touch-screen. Also, some or all of the sound reproduction unit, the sound collecting unit, the image display unit, the image capturing unit, and the operation input unit may be integrally formed in the mobile station apparatus 21 or may be provided separately from the mobile station apparatus 21.

(Configuration of Control Unit)

Next, a configuration of the control unit 214 according to the present embodiment will be described.

Figure 3:
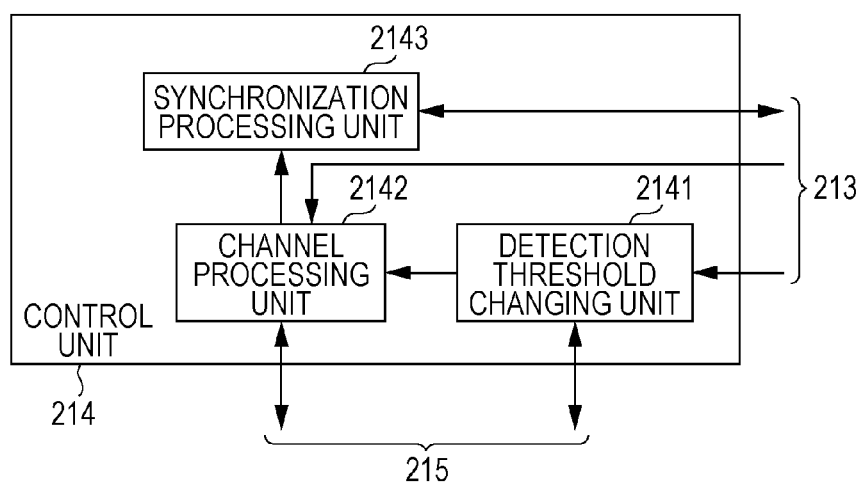
FIG. 3 is a schematic block diagram illustrating a configuration of a control unit according to the present embodiment.

FIG. 3 is a schematic block diagram illustrating a configuration of the control unit 214 according to the present embodiment.

The control unit 214 includes a detection threshold changing unit 2141, a channel processing unit (channel selecting unit) 2142, and a synchronization processing unit 2143. Illustration of the user interface 216 is omitted in FIG. 3.

The detection threshold changing unit 2141 determines a detection threshold used for detecting a frequency band (channel) of a received signal received from the base station apparatus 11, on the basis of use environment information representing a use environment of the mobile station apparatus 21. Here, the detection threshold changing unit 2141 reads, for example, located area history information from the memory unit 215, and extracts country information from the latest located area history information entry of the read located area history information. The located area history information is information representing a history regarding the base station apparatus 11 related to a cell to which the mobile station apparatus 21 belongs or regarding a network connected to the base station apparatus 11. The located area history information includes communication operator information and frequency band information as well as the country information. The located area history information is information included in broadcast information (described later).

The detection threshold changing unit 2141 reads detection threshold information corresponding to the extracted country information from detection-threshold correspondence information stored in the memory unit 215, and outputs the read detection threshold information to the channel processing unit 2142. In this way, the detection threshold set in the channel processing unit 2142 is changed. The detection-threshold correspondence information is information in which the country information serving as the use environment information is associated with the detection threshold. An example of the detection-threshold correspondence information will be described later.

The channel processing unit 2142 selects, from the received signal received from the base station apparatus 11, a channel having a strength that is higher than the detection threshold represented by the detection threshold information input thereto from the detection threshold changing unit 2141. Here, the received signal strength information for each channel is input to the channel processing unit 2142 from the transmission/reception unit 213, and the channel processing unit 2142 compares the received signal strength with the detection threshold represented by the detection threshold information input thereto from the detection threshold changing unit 2141. The channel processing unit 2142 selects a channel having a received signal strength represented by the input received signal strength information that is larger than the detection threshold represented by the input detection threshold information. The channel processing unit 2142 outputs channel selection information representing the selected channel to the synchronization processing unit 2143. Examples of the channel selection process will be described later.

Also, immediately after a cell search (described later) has ended, broadcast information is input to the channel processing unit 2142 from the transmission/reception unit 213 as a received signal from the base station apparatus, and the channel processing unit 2142 extracts located area history information from the input broadcast information. The channel processing unit 2142 may store the extracted located area history information in the memory unit 215. Alternatively, the channel processing unit 2142 may extract the located area history information from demodulated broadcast information obtained through a synchronization process (described later) by the synchronization processing unit 2143, and may store the extracted located area history information in the memory unit 215.

The synchronization processing unit 2143 performs a synchronization process on a reception wave of a channel represented by the channel selection information input thereto from the channel processing unit 2142. Here, the channel selection information is input to the synchronization processing unit 2143 from the channel processing unit 2142, and broadcast information which has been modulated for each channel is input to the synchronization processing unit 2143 from the transmission/reception unit 213 as a received signal received from the base station apparatus 11. The synchronization processing unit 2143 detects a synchronization signal included in the broadcast information input for each channel represented by the input channel selection information. The synchronization processing unit 2143 identifies data that configures the broadcast information using the detected synchronization signal, and decodes the identified data to obtain the broadcast information. The synchronization processing unit 2143 attempts such a process until a channel (usable channel) for which both detection of a synchronization signal and demodulation of broadcast information are successful is detected. The synchronization processing unit 2143 outputs a location registration request signal to the transmission/reception unit 213 as a transmit signal that uses the usable channel intended for the base station apparatus 11 (camp-on). A location registration request signal is a signal used to make a request for registration of the mobile station apparatus as the one used for communication. Thereafter, the transmission/reception unit 213 receives a location registration completion signal and located area history information from the base station apparatus 11. In this way, the mobile station apparatus 21 becomes able to perform communication. Examples of the synchronization process will be described later. The channel selection process performed by the channel processing unit 2142 and the synchronization process performed by the synchronization processing unit 2143, which are described above, are collectively referred to as a cell search.

(Example of Detection-Threshold Correspondence Information)

Next, an example of the detection-threshold correspondence information according to the present embodiment will be described.

FIG. 4 is a diagram illustrating an example of the detection-threshold correspondence information according to the present embodiment.

In FIG. 4, the left column shows the country information serving as the use environment information, and the right column shows detection threshold information.

The second row indicates that pieces of country information AC and BC are associated with a detection threshold D. The third row indicates that country information other than AC and BC is associated with a detection threshold E. Accordingly, in the case where the country information AC is extracted from the located area history information, the detection threshold changing unit 2141 sets the detection threshold D. In the case where the country information other than AC and BC (for example, country information CC) is extracted from the located area history information, the detection threshold changing unit 2141 sets the detection threshold E. In the case where no located area history information is stored such as immediately after the mobile station apparatus 21 has been shipped, the detection threshold changing unit 2141 also sets the detection threshold E.

Now, the pieces of country information AC and BC represent countries in which a network that can be used by the mobile station apparatus 21 is operated, and the detection threshold D (for example, −105 (dBm)) is smaller than the detection threshold E (for example, −90 (dBm)).

When the mobile station apparatus 21 is moved to the out-of-service area after being located in the country in which the usable network is operated, the detection threshold D lower than the detection threshold E is selected.

With this configuration, even when the mobile station apparatus 21 is located at a location where a radio wave does not reach from the base station apparatus 11 or a location where a radio wave is difficult to reach (for example, a remote location), channel selection can be made more successful using a weak received signal.

On the other hand, when the mobile station apparatus 21 is operating in a country in which the usable network is not operated, such as in a country represented by the country information CC, the detection threshold E higher than the detection threshold D is selected. This can prevent the mobile station apparatus 21 from erroneously selecting noise, for example, ambient noise or white noise, or a weak received signal from another system.

Note that, in the present embodiment, the country information and country's frequency band information which represents a frequency band used in the country may be associated with each other in the detection-threshold correspondence information stored in the memory unit 215. In such a case, the detection threshold changing unit 2141 selects the detection threshold information (for example, the detection threshold D) for the country's frequency band (for example, 800-MHz band or 900-MHz band) corresponding to the country information extracted from the located area history information. For another frequency band (for example, 1800-MHz band or 1900-MHz band) that can be used by the mobile station apparatus 21, the detection threshold changing unit 2141 determines a detection threshold (for example, the detection threshold E) that is higher than a value represented by the detection threshold information for the country's frequency band by a predetermined value.

This can make channel detection more successful in a frequency band used in the country. Also, this can prevent erroneous detection of a received signal such as noise in the other frequency bands.

(Example of Located Area History Information)

Next, an example of the located area history information according to the present embodiment will be described.

FIG. 5 is a diagram illustrating an example of the located area history information according to the present embodiment.

The located area history information illustrated in FIG. 5 is obtained when the mobile station apparatus 22 (FIG. 1) is moved from a location belonging to the cell 11c of the base station apparatus 11 to the area of the cell 12c through the out-of-service area.

FIG. 5 shows, sequentially from the leftmost column to the right side, base station information, country information, communication operator information, and frequency band information. The base station information is information representing a base station apparatus that covers an area in which the mobile station apparatus 22 is located. The country information is information (MCC: Mobile Country Code) representing a country which is an area in which a network connected to the base station apparatus is operated. The communication operator information is information (MNC: Mobile Network Code) representing an operator (carrier) that operates the network connected to the base station apparatus. A combination of MCC and MNC serves as PLMN identification information (PLMN Identify). The frequency band information is information representing a frequency band on which the network connected to the base station apparatus is operated, that is, a frequency band that can be used by the base station apparatus. These pieces of information are included in broadcast information (BCCH broadcast information) that has been mapped to and received on a BCCH (Broadcast Control Channel). The memory unit 215 may store, as the located area history information, not only the latest information but also information obtained when the mobile station apparatus has been located in areas before. In such a case, after the number of pieces of located area history information stored in the memory unit 215 has reached a predetermined upper limit (for example, 10), the channel processing unit 2142 may delete the oldest information.

In the second row of FIG. 5, country information X, communication operator information XOP, and frequency band information XBW are associated with the base station apparatus 11. In the third row, country information Y, communication operator information YOP, and frequency band information YBW are associated with the base station apparatus 12.

The pieces of country information X and Y belong to "OTHERS" of the third row of FIG. 4. Thus, the detection threshold changing unit 2141 selects the detection threshold E during a cell search performed before starting communication with the base station apparatuses 11 and 12. Note that, in the case where the country information AC or BC is extracted from the located area history information, the detection threshold changing unit 2141 selects the detection threshold D. In the case where no located area history information is stored such as immediately after the mobile station apparatus 21 has been shipped, the detection threshold changing unit 2141 also sets the detection threshold E.

(Example of Received Signal Strength Information)

Next, an example of the received signal strength information will be described.

Figure 6:
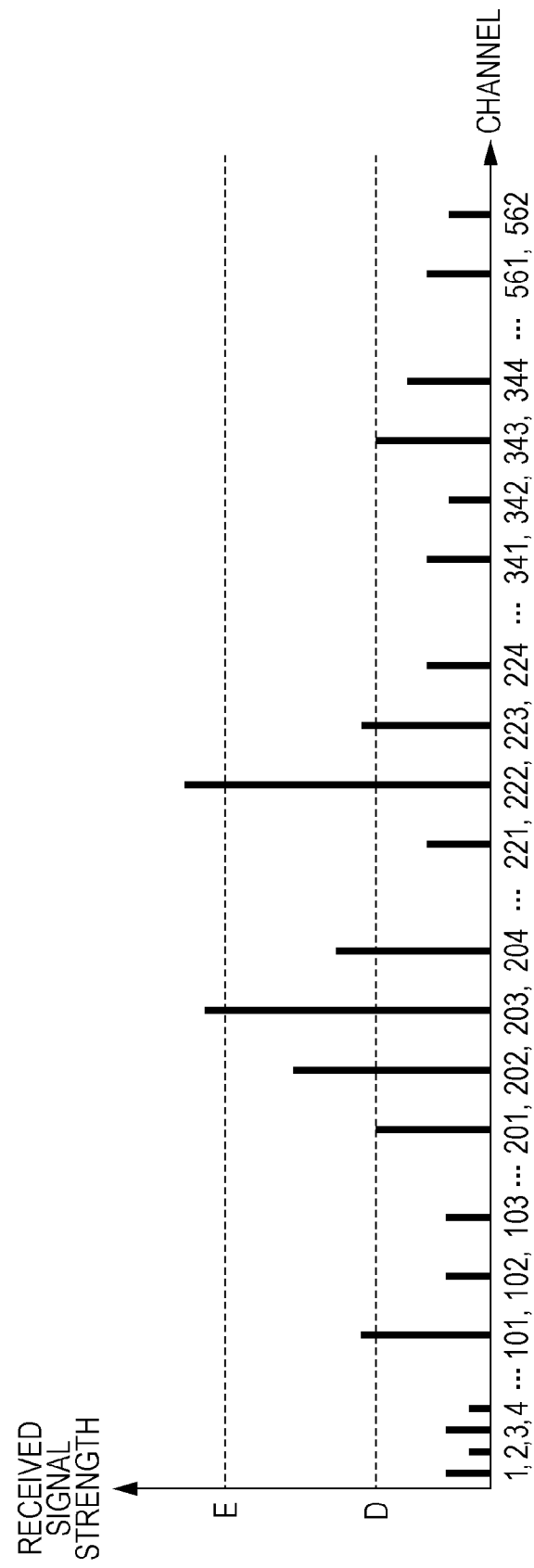
FIG. 6 is a diagram illustrating an example of received signal strength information.

FIG. 6 is a diagram illustrating an example of the received signal strength information.

In FIG. 6, the horizontal axis represents the channel, and the vertical axis represents the received signal strength. FIG. 6 illustrates the detection thresholds D and E illustrated in FIG. 4, and the unit of the vertical axis is omitted. In this example, channels that can be received by the mobile station apparatus 21 are channels 1-104, 201-224, and 341-564. In FIG. 6, the height of the vertical line for each channel represents the received signal strength of the channel.

In the case where the detection threshold E (for example, −90 (dBm)) is selected by the detection threshold changing unit 2141, the channel processing unit 2142 selects channels having a received signal strength higher than the detection threshold E from among all the receivable channels. In this case, combinations of the selected channel and the received signal strength are those of two channels, i.e., (203, −88 (dBm)) and (222, −85 (dBm)).

In the case where the detection threshold D (for example, −105 (dBm)) is selected by the detection threshold changing unit 2141, the channel processing unit 2142 selects channels having a received signal strength higher than the detection threshold D. In this case, combinations of the selected channel and the received signal strength are those of six channels, i.e., (101, −104 (dBm)), (202, −98 (dBm)), (203, −88 (dBm)), (204, −99 (dBm)), (222, −85 (dBm)), and (223, −94 (dBm)). By limiting channels to be handled by the synchronization processing unit 2143 to channels for which the synchronization process is more likely to be successful in this way, an unnecessary synchronization process can be reduced. Also, in the case where a use environment (for example, country information) that is not in use is obtained, the detection threshold changing unit 2141 gives a higher detection threshold, whereby channels selected by the channel processing unit 2142 can be limited and an unnecessary synchronization process performed thereafter can be reduced. On the other hand, even in the case where the use environment has changed in a state where the mobile station apparatus is unable to perform communication as a result of movement to the out-of-service area, the synchronization process is not completely eliminated and a possibility of the mobile station apparatus entering a state in which communication can be performed using a channel having a strong reception wave is left.

It is assumed here that the mobile station apparatus 21 can use a network that employs the GSM (registered trademark) scheme. The GSM (registered trademark) scheme is not used in Japan but is used in Europe and China. Accordingly, in the case where the country information included in the located area history information represents Japan, the detection threshold E giving a higher value is selected. At this time, a cell search is performed by making the detection threshold higher to lower the sensitivity. In the case where the user is actually located in Japan, noise having a reception strength lower than the detection threshold is no longer erroneously detected as a result of increasing of the detection threshold and limiting of the number of to-be-selected channels, and thus a processing amount of the synchronization process performed thereafter is reduced.

However, there may be cases where the user has moved to the out-of-service area or moved to Europe or China after terminating the operation even if the country information represents Japan. In such cases, even in the state where the detection threshold is made higher, a received signal having a high reception strength is detected, and thus a synchronization process is performed and the user becomes able to perform communication by using a network in which the received signal has been detected.

On the other hand, in the case where the country information included in the located area history information represents Europe, the detection threshold D giving a lower value is selected. At this time, a cell search is performed by making the detection threshold lower to increase the sensitivity.

(Channel Selection Process)

Next, a channel selection process of a communication process according to the present embodiment will be described.

Figure 7:
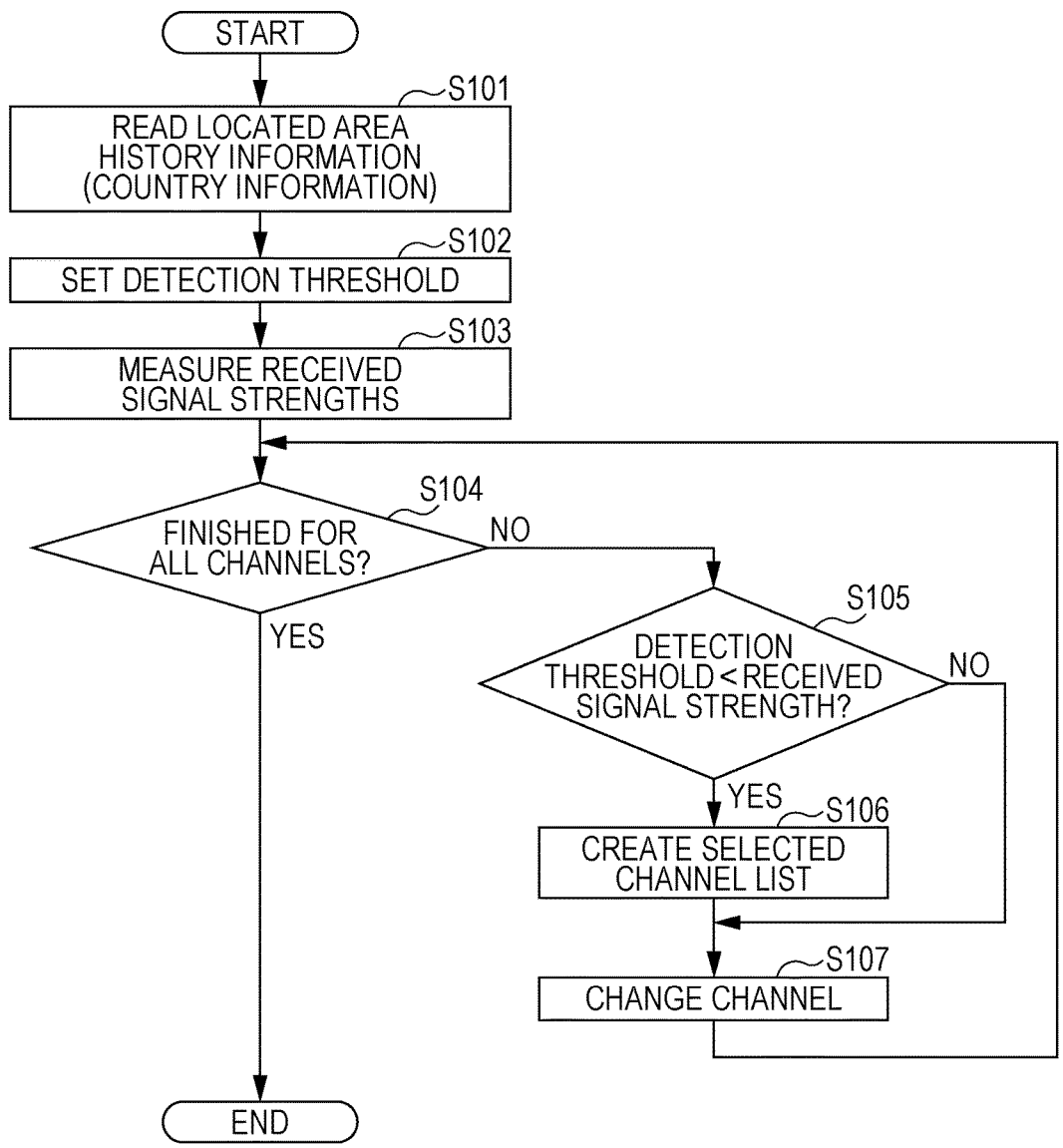
FIG. 7 is a flowchart illustrating a channel selection process according to the present embodiment.

FIG. 7 is a flowchart illustrating a channel selection process according to the present embodiment.

(Step S101) The detection threshold changing unit 2141 reads the located area history information stored in the memory unit 215, and extracts the country information from the latest located area history information entry of the read located area history information. Then, the process proceeds to step S102.

(Step S102) The detection threshold changing unit 2141 reads the detection threshold information based on the extracted country information from the detection-threshold correspondence information stored in the memory unit 215, and sets the read detection threshold information in the channel processing unit 2142. Then, the process proceeds to step S103.

(Step S103) The transmission/reception unit 213 measures, for all receivable channels, received signal strengths of a received signal received from the base station apparatus 11. Then, the process proceeds to step S104.

(Step S104) The channel processing unit 2142 determines whether or not processing of steps S105 to S107 has been finished for all receivable channels. If it is determined that the processing has been finished (YES in step S104), the process of this flowchart ends. If it is determined that the processing has not been finished (NO in step S104), the process proceeds to step S105.

(Step S105) The channel processing unit 2142 determines whether or not the received signal strength measured for a processing target channel (target channel) is larger than the set detection threshold. If it is determined that the received signal strength is larger (YES in step S105), the process proceeds to step S106. If it is determined that the received signal strength is not larger (NO in step S105), the process proceeds to step S107.

(Step S106) The channel processing unit 2142 stores the number assigned to the target channel and the received signal strength thereof in the memory unit 215 in association with each other, and creates a selected channel list. Then, the process proceeds to step S107.

(Step S107) The channel processing unit 2142 changes the target channel to another unprocessed channel. Here, the channel processing unit 2142 may change the target channel to the adjacent channel in ascending order of channel number. Then, the process returns to step S104.

In this way, the selected channel list is generated in which the channel number of each channel having a received signal strength higher than the detection threshold and the received signal strength of the channel are associated with each other.

(Synchronization Process)

Next, a synchronization process of the communication process according to the present embodiment will be described.

FIG. 8 is a flowchart illustrating a synchronization process according to the present embodiment.

(Step S111) The channel processing unit 2142 rearranges combinations which are included in the generated selected channel list and in which the channel number and the received signal strength are associated each other, in descending order of the received signal strength, and generates a detected channel list as channel selection information. Then, the process proceeds to step S112.

(Step S112) The synchronization processing unit 2143 determines whether or not data is included in the detected channel list. If it is determined that data is included in the detected channel list (YES in step S112), the process proceeds to step S113. If it is determined that data is not included in the detected channel list (NO in step S112), the process proceeds to step S119.

(Step S113) The synchronization processing unit 2143 sets the first channel included in the detected channel list as the target channel, and performs a known synchronization process. Here, the synchronization processing unit 2143 detects a synchronization signal assigned to the target channel among the received signal received from the base station apparatus 11. The synchronization signal is, for example, an SCH synchronization signal mapped to the synchronization channel (SCH). The synchronization signal includes a cell ID for identifying the base station apparatus 11. Based on the received SCH synchronization signal, the synchronization processing unit 2143 identifies ranges of individual frames in the received signal, that is, frame timings. Then, the process proceeds to step S114.

(Step S114) The synchronization processing unit 2143 determines whether or not the SCH synchronization signal has been successfully obtained. In this way, whether or not the synchronization process is successful is determined. If it is determined that the SCH synchronization signal has been successfully obtained (YES in step S114), the process proceeds to step S115. If it is determined that the SCH synchronization signal has not been successfully obtained (NO in step S114), the process proceeds to step S118.

(Step S115) The synchronization processing unit 2143 decodes BCCH broadcast information included in the received signal. Then, the process proceeds to step S116.

(Step S116) The synchronization processing unit 2143 determines whether or not the mobile station apparatus is located within the cell 11c of the base station apparatus 11, that is, whether or not the base station apparatus 11 is an appropriate base station apparatus, on the basis of the BCCH broadcast information obtained from decoding. For example, the synchronization processing unit 2143 determines whether or not there is PLMN represented by the BCCH broadcast information that matches PLMN represented by preset subscriber information (SIM: Subscriber Identity Module). If it is determined that the mobile station apparatus is located within the cell (YES in step S116), the process proceeds to step S117. If it is determined that the mobile station apparatus is not located within the cell (NO in step S116), the process proceeds to step S118.

(Step S117) The synchronization processing unit 2143 transmits a location registration request signal to the base station apparatus 11 so as to perform location registration (camp-on), and becomes able to perform communication. Thereafter, the process of this flowchart, consequently, the cell search ends.

(Step S118) The synchronization processing unit 2143 deletes the first channel number and received signal strength of the target channel included in the detected channel list, and updates the target channel to a channel having the next highest received signal strength. Then, the process returns to step S112.

(Step S119) The synchronization processing unit 2143 determines that there is no cell in which the mobile station apparatus can be located. Then, the process proceeds to step S120.

(Step S120) The mobile station apparatus waits for a certain period (for example, 10 minutes). Thereafter, the channel selection process (FIG. 7) is repeated.

In this way, in the above-described example, by setting the detection threshold on the basis of the country information, a possibility that the minimum number of channels to be subjected to the synchronization process is to be selected is left and the number of to-be-selected channels is reduced. An amount of power consumption for the synchronization process is much (for example, approximately 50-100 times) larger than that of the case where the synchronization process is not performed, that is, that of the channel selection process. Accordingly, by reducing the time and power consumption for the synchronization process of a cell search, the entire power consumption for the cell search can be reduced.

(Modification 1-1)

Next, a modification 1-1 of the present embodiment will be described. In the present modification, the detection threshold changing unit 2141 may use the communication operator information as the use environment information, instead of the country information. The other points are similar to those of the above-described example.

Here, the detection threshold changing unit 2141 extracts the communication operator information from the latest located area history information entry of the located area history information read from the memory unit 215. The detection threshold changing unit 2141 reads the detection threshold information corresponding to the extracted communication operator information from the detection-threshold correspondence information stored in the memory unit 215.

Next, an example of the detection-threshold correspondence information according to the present modification will be described.

FIG. 9 is a diagram illustrating an example of the detection-threshold correspondence information according to the present modification.

In FIG. 9, the left column shows the communication operator information serving as the use environment information, and the right column shows the detection threshold information.

The second row indicates that pieces of communication operator information AOP and BOP are associated with the detection threshold D. The third row indicates that communication operator information other than AOP and BOP is associated with the detection threshold E. For example, in the case where the communication operator information AOP is extracted from the located area history information, the detection threshold changing unit 2141 sets the detection threshold D. In the case where communication operator information other than AOP and BOP (for example, COP) is extracted from the located area history information, the detection threshold changing unit 2141 sets the detection threshold E. In the case where no located area history information is stored, the detection threshold changing unit 2141 also sets the detection threshold E.

Next, a channel selection process according to the present modification will be described.

FIG. 10 is a flowchart illustrating a channel selection process according to the present modification.

The channel selection process according to the present modification includes steps S121 and S122 instead of steps S101 and S102 of the channel selection process illustrated in FIG. 7.

(Step S121) The detection threshold changing unit 2141 reads the located area history information stored in the memory unit 215, and extracts the communication operator information from the latest located area history information entry from the read located area history information. Then, the process proceeds to step S122.

(Step S122) The detection threshold changing unit 2141 reads the detection threshold information based on the extracted communication operator information from the detection-threshold correspondence information stored in the memory unit 215, and sets the read detection threshold information in the channel processing unit 2142. Then, the process proceeds to step S103.

By setting the detection threshold on the basis of the communication operator information in this way, a possibility that the minimum number of channels to be subjected to the synchronization process is to be selected is left and the number of to-be-selected channels is reduced in the present modification. Thus, the time and power consumption for the synchronization process can be reduced.

(Modification 1-2)

Next, a modification 1-2 of the present embodiment will be described. In the present modification, the detection threshold changing unit 2141 may use the frequency band information (band information) as the use environment information, instead of the country information. A frequency band represented by the frequency band information is composed of a plurality of channels (for example, 72 channels in the case where the bandwidth is 1.4 MHz), and serves as an allocation unit for transmission or reception of data between this apparatus (the mobile station apparatus 21) and the base station apparatus 11. The other points are similar to those of the above-described example.

Here, the detection threshold changing unit 2141 extracts the frequency band information from the latest located area history information entry of the located area history information read from the memory unit 215. The detection threshold changing unit 2141 reads the detection threshold information corresponding to the extracted frequency band information from the detection-threshold correspondence information stored in the memory unit 215. For frequency bands except for the frequency band represented by the extracted frequency band information among frequency bands that can be used by the mobile station apparatus 21, the detection threshold changing unit 2141 reads the detection threshold information corresponding to other frequency band information from the memory unit 215.

Next, an example of the detection-threshold correspondence information according to the present modification will be described.

FIG. 11 is a diagram illustrating an example of the detection-threshold correspondence information according to the present modification.

In FIG. 11, the left column shows the frequency band information serving as the use environment information, and the right column shows the detection threshold information.

The second row indicates that pieces of frequency band information XBW and YBW are associated with the detection threshold D. The third row indicates that frequency band information other than XBW and YBW is associated with the detection threshold E.

For example, in the case where the frequency band information XBW is extracted from the located area history information, the detection threshold changing unit 2141 determines the detection threshold D for the frequency band represented by the frequency band information XBW and determines the detection threshold E for the other usable frequency bands. In the case where the frequency band information other than XBW and YBW (for example, ZBW) is extracted from the located area history information, the detection threshold changing unit 2141 determines the detection threshold E for all the frequency bands that can be used by the mobile station apparatus 21 including frequency bands represented by the frequency band information ZBW.

Next, a channel selection process according to the present modification will be described.

FIG. 12 is a flowchart illustrating a channel selection process according to the present modification.

The channel selection process according to the present modification includes steps S131 and S132 instead of steps S101 and S102 of the channel selection process illustrated in FIG. 7.

(Step S131) The detection threshold changing unit 2141 reads the located area history information stored in the memory unit 215, and extracts the frequency band information from the latest located area history information entry of the read located area history information. Then, the process proceeds to step S132.

(Step S132) The detection threshold changing unit 2141 reads the detection threshold information corresponding to the extracted frequency band information from the detection-threshold correspondence information stored in the memory unit 215, among the frequency bands that can be used by the mobile station apparatus 21. For the frequency bands except for the frequency band represented by the extracted frequency band information among the frequency bands that can be used by the mobile station apparatus 21, the detection threshold changing unit 2141 reads the detection threshold information corresponding to the other frequency band information from the memory unit 215. The detection threshold changing unit 2141 sets the individual pieces of detection threshold information for the usable frequency bands in the channel processing unit 2142. Then, the process proceeds to step S103.

Next, an example of the detection threshold information according to the present modification will be described.

Figure 13:
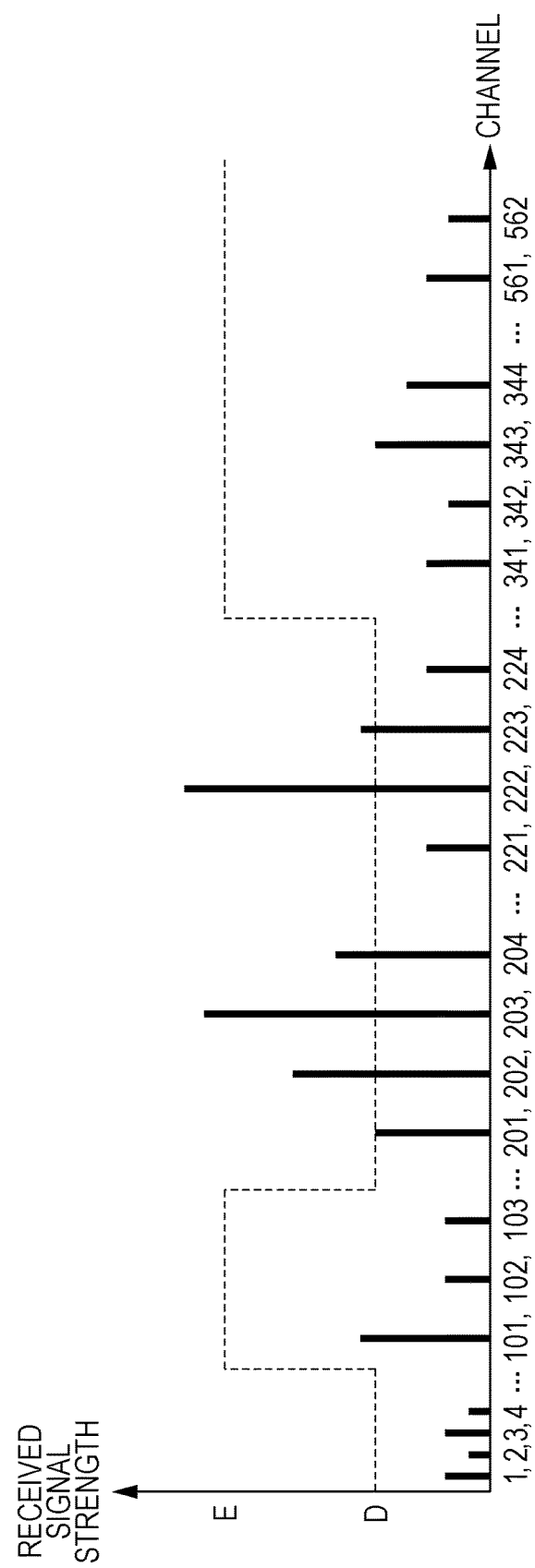
FIG. 13 is a diagram illustrating an example of detection threshold information according to the present modification.

FIG. 13 is a diagram illustrating an example of the detection threshold information according to the present modification.

In FIG. 13, the horizontal axis represents the channel, and the vertical axis represents the received signal strength. In this example, frequency bands that can be used by the mobile station apparatus 21 are five frequency bands of band0, band100, band200, band300, and band500. Ranges of channels included in band0, band100, band200, band300, and 500 are 0-99, 100-199, 200-299, 300-399, and 500-599, respectively. In this example, the frequency band information extracted by the detection threshold changing unit 2141 represents band0 and band200. A dashed line indicates that the detection threshold for band0 including channels 0-99 and band200 including channels 200-299 is D and that the detection threshold for the other channels is E.

The received signal strength of each channel illustrated in FIG. 13 is the same as the corresponding received signal strength illustrated in FIG. 6.

In the case where the detection threshold D is −105 (dBm) and the detection threshold E is −90 (dBm), the channel processing unit 2142 selects the following five channels. Combinations of the selected channel and the received signal strength are (202, −98 (dBm)), (203, −88 (dBm)), (204, −99 (dBm)), (222, −85 (dBm)), and (223, −94 (dBm)).

Note that the case where the detection threshold changing unit 2141 determines the detection threshold for each frequency band has been described above as an example; however, in the present modification, the detection threshold changing unit 2141 may determine the detection threshold for each channel.

By setting the detection threshold on the basis of the frequency band information in this way, a possibility that the minimum number of channels to be subjected to the synchronization process is to be selected is left and the number of to-be-selected channels is reduced in the present modification. Consequently, the time and power consumption for the synchronization process can be reduced.

(Modification 1-3)

Next, a modification 1-3 of the present embodiment will be described. In the present modification, the detection threshold changing unit 2141 determines, for each piece of the use environment information, a priority in accordance with a use state of the use environment information, and determines the detection threshold such that the detection threshold becomes lower as the determined priority becomes higher so as to detect a reception wave of a channel having a low received signal strength. Also, the detection threshold changing unit 2141 determines the detection threshold such that the detection threshold becomes higher as the priority becomes lower so as not to detect a reception wave of a channel having a low received signal strength.

The detection threshold changing unit 2141 extracts, for example, pieces of frequency band information as the use environment information from the located area history information read from the memory unit 215, and counts, for each frequency band represented by the corresponding one of the extracted pieces of frequency band information, the number of times the frequency band has been stored. Then, the detection threshold changing unit 2141 determines, for each frequency band, a priority such that the priority becomes higher for the frequency band having a larger count.

For example, in the case where the pieces of frequency band information XBW and YBW are included in the located area history information four times and twice, respectively, the detection threshold changing unit 2141 determines the priority such that the priority for the frequency band information XBW becomes higher than the priority for the frequency band information YBW. Here, the priorities for the pieces of frequency band information XBW and YBW are referred to as priorities 1 and 2, respectively.

The detection threshold changing unit 2141 reads the detection threshold information corresponding to the determined priority from the memory unit 215. For frequency bands except for the frequency band represented by the extracted frequency band information among the frequency bands that can be used by the mobile station apparatus 21, the detection threshold changing unit 2141 reads the detection threshold information corresponding to the other frequency band information from the memory unit 215. Here, in the detection-threshold correspondence information prestored in the memory unit 215, detection threshold information representing a lower detection threshold is associated with a higher priority. Also, for the other frequency band information, detection threshold information representing the highest detection threshold is associated by setting the priority low.

Next, an example of the detection-threshold correspondence information selected in the present modification will be described.

FIG. 14 is a diagram illustrating an example of the detection-threshold correspondence information according to the present modification.

In FIG. 14, the left column shows the frequency band information serving as the use environment information, and the right column shows the detection threshold information.

The second row indicates that the detection threshold D assigned the highest priority 1 is associated with the frequency band information XBW. The third row indicates that a detection threshold F assigned the next highest priority 2 is associated with the frequency band information YBW. The fourth row indicates that the detection threshold E is associated with priority information other than those for XBW and YBW. Also, as in the above-described modifications, in the case where the frequency band information is unknown, the detection threshold E is given. In this example, the detection threshold is in the order of D<F<E. With this configuration, even if a channel included in a frequency band assigned a high priority is weak, the channel is easily detected; detection of noise or the like is avoided for a channel assigned the lowest priority, and a possibility of detecting a channel having a strong received signal strength from the base station apparatus is left.

Next, a channel selection process according to the present modification will be described.

FIG. 15 is a flowchart illustrating a channel selection process according to the present modification.

The channel selection process according to the present modification includes steps S141 and S142 instead of steps S101 and S102 of the channel selection process illustrated in FIG. 7.

(Step S141) The detection threshold changing unit 2141 reads the located area history information stored in the memory unit 215, and extracts pieces of frequency band information on the basis of the read located area history information. The detection threshold changing unit 2141 determines priorities for the extracted pieces of frequency band information. Then, the process proceeds to step S142.

(Step S142) The detection threshold changing unit 2141 reads the detection threshold information corresponding to the determined priority from the detection-threshold correspondence information stored in the memory unit 215. For frequency bands except for the frequency band represented by the extracted frequency band information among frequency bands that can be used by the mobile station apparatus 21, the detection threshold changing unit 2141 reads the detection threshold information corresponding to the other frequency band information from the memory unit 215. The detection threshold changing unit 2141 sets the individual pieces of detection threshold information for the usable frequency bands in the channel processing unit 2142. Then, the process proceeds to step S103.

Next, an example of the detection threshold information selected in the present modification will be described.

Figure 16:
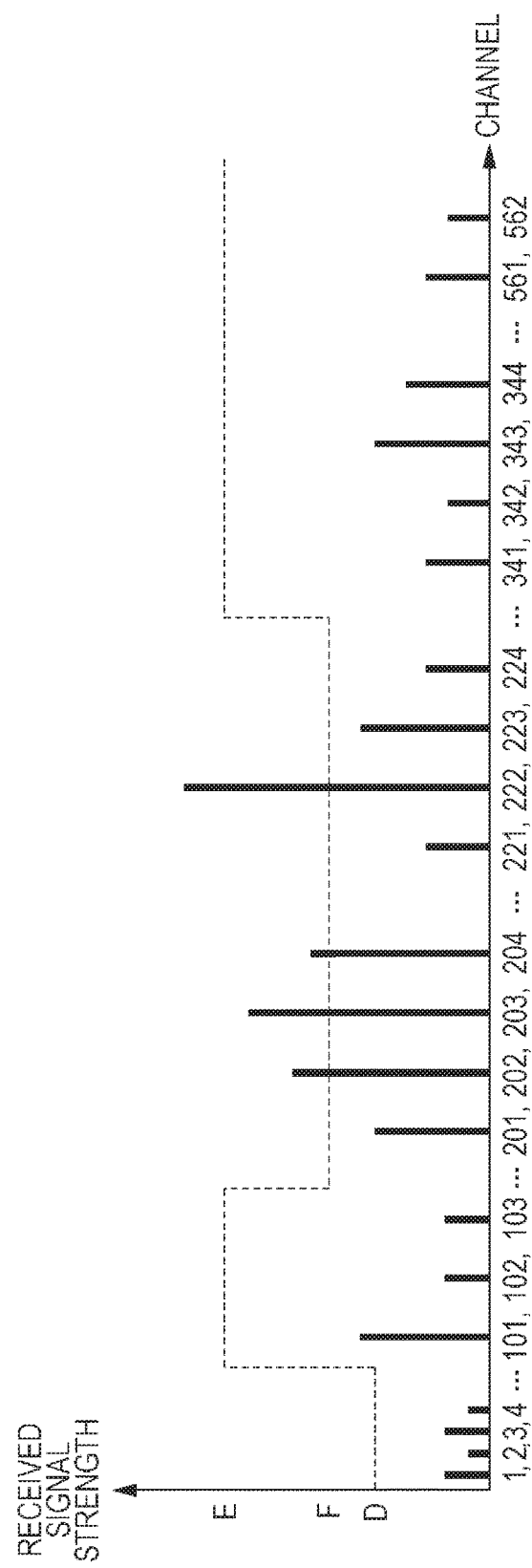
FIG. 16 is a diagram illustrating an example of detection threshold information according to the present modification.

FIG. 16 is a diagram illustrating an example of the detection threshold information according to the present modification.

In FIG. 16, the horizontal axis represents the channel, and the vertical axis represents the received signal strength. In this example, frequency bands that can be used by the mobile station apparatus 21 are five frequency bands of band0, band100, band200, band300, and band500. Ranges of channels included in band0, band100, band200, band300, and 500 are 0-99, 100-199, 200-299, 300-399, and 500-599, respectively. It is assumed here that band0 and band200 are included in the located area history information stored in the memory unit 215 four times and twice, respectively.

In this case, because the count for band0 is the largest and the count for band200 is the next largest, the detection threshold changing unit 2141 determines priorities for band0 and band200 to priorities 1 and 2, respectively. In FIG. 16, a dashed line indicates that the detection thresholds for band0 including channels 0-99 and band200 including channels 200-299 are D and F, respectively, and that the detection threshold for the other channels assigned the lowest priority is E.

The received signal strength of each channel illustrated in FIG. 16 is the same as the corresponding received signal strength illustrated in FIG. 6.

In the case where the detection threshold D is −105 (dBm), the detection threshold F is −100 (dBm), and the detection threshold E is −90 (dBm), the channel processing unit 2142 selects the following four channels. Combinations of the selected channel and the received signal strength are (202, −98 (dBm)), (203, −88 (dBm)), (204, −99 (dBm)), and (222, −85 (dBm)).

Note that the case where the detection threshold changing unit 2141 determines the detection threshold for each frequency band serving as the piece of the use environment information has been described above as an example; however, in the present modification, the detection threshold changing unit 2141 may determine the detection threshold for each channel.

The case where the priority is determined on the basis of the count which serves as the use state of each piece of the use environment information has been described above as an example; however, in the present modification, the detection threshold changing unit 2141 may determine the priority such that the priority becomes higher as an index value representing the use state, such as a cell location duration or reception strength, instead of the count, becomes larger. To this end, the detection threshold changing unit 2141 stores a duration over which the mobile station apparatus is located within the cell of the frequency band, the reception strength, or the like in the memory unit 215 in association with the frequency band information as the located area history information.

Alternatively, the detection threshold changing unit 2141 may determine the priority such that the priority becomes higher for use environment information newly stored as the located area history information, for example, the newly stored frequency band information. In the case where the frequency band information of the same type is included in the located area history information twice or more than twice, the detection threshold changing unit 2141 may ignore the frequency band information that appears more than twice.

The case where the detection threshold changing unit 2141 determines the priority mainly for each frequency band has been described above as an example; however, in the present modification, the detection threshold changing unit 2141 may determine the priority for the other use environment information, for example, for each country information or communication operator information.

As described above, in the present modification, the detection threshold is set in accordance with the use state of each piece of the use environment information. With this configuration, a possibility that the minimum number of channels to be subjected to the synchronization process is to be selected is left and channels are selected on the basis of the use state of each piece of the use environment information. By reducing the number of channels selected in accordance with the use state of each piece of the use environment information in this way, the time and power consumption for the synchronization process to be performed next can be reduced.

As described above, in the present embodiment, the detection threshold used for detecting a reception wave received from the base station apparatus is determined on the basis of the use environment information which represents the use environment of this apparatus, only channels having a reception level higher than the detection threshold are selected, and the synchronization process is performed on reception waves of the selected channels.

In this way, a possibility that the minimum number of channels to be subjected to the synchronization process is to be selected is left and the number of to-be-selected channels is reduced. Accordingly, the time and power consumption for the synchronization process of the cell search can be reduced.

Second Embodiment

Next, a second embodiment of the present invention will be described. Configurations that are the same as those of the above-described embodiment are denoted by the same reference signs, and the description is incorporated herein by reference.

A communication system 2 (not illustrated) according to the present embodiment includes a mobile station apparatus 23 instead of the mobile station apparatus 21 of the communication system 1 (FIG. 1). Now, a configuration of the mobile station apparatus 23 will be described.

Figure 17:
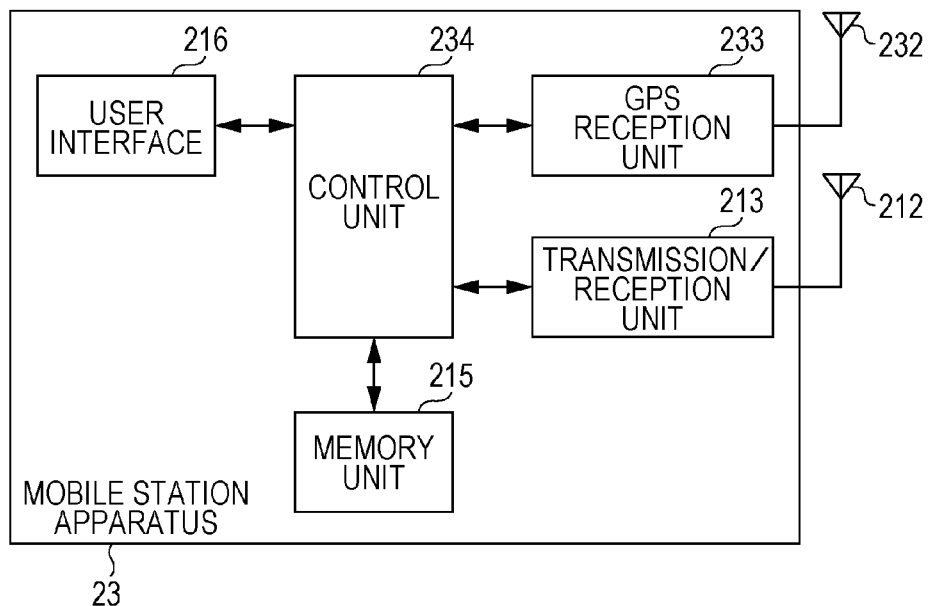
FIG. 17 is a schematic block diagram illustrating a configuration of a mobile station apparatus according to a second embodiment of the present invention.

FIG. 17 is a schematic block diagram illustrating a configuration of the mobile station apparatus 23 according to the present embodiment.

The mobile station apparatus 23 includes the antenna 212, the transmission/reception unit 213, the memory unit 215, the user interface 216, a GPS (Global Positioning System) antenna 232, a GPS reception unit 233, and a control unit 234. That is, the mobile station apparatus 23 includes the control unit 234 instead of the control unit 214 of the mobile station apparatus 21 (FIG. 2) and further includes the GPS antenna 232 and the GPS reception unit 233.

The GPS antenna 232 receives a signal for determining a location (location determination signal) that has been transmitted by a GPS satellite in a form of a radio wave, and outputs the received location determination signal as an electric signal to the GPS reception unit 233.

The GPS reception unit 233 demodulates the location determination signal input thereto from the GPS antenna 232, and calculates the location (for example, the latitude and longitude) of the mobile station apparatus 23 on the basis of the demodulated location determination signal using a known method (for example, a code positioning method). The GPS reception unit 233 generates location information that represents the calculated location, and outputs the generated location information to the control unit 234.

Accordingly, the GPS antenna 232 and the GPS reception unit 233 constitute a location determining unit configured to determine a location of this mobile station apparatus.

Next, a configuration of the control unit 234 according to the present embodiment will be described.

Figure 18:
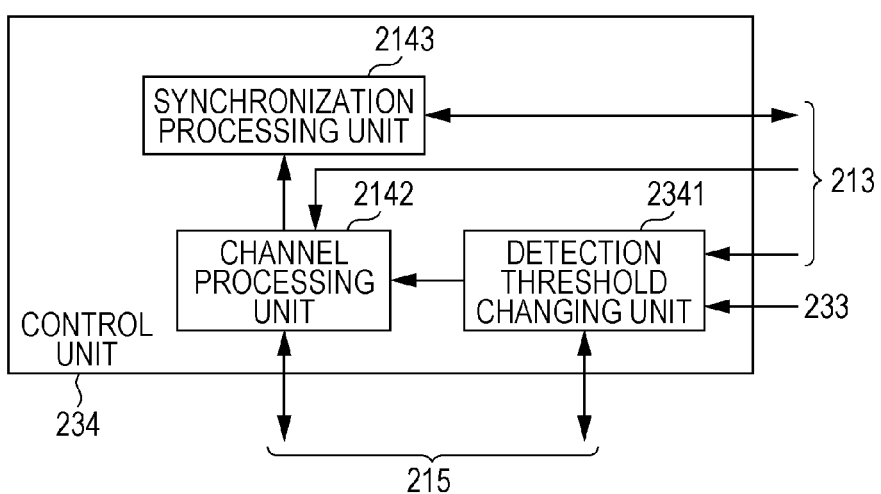
FIG. 18 is a schematic block diagram illustrating a configuration of a control unit according to the present embodiment.

FIG. 18 is a schematic block diagram illustrating a configuration of the control unit 234 according to the present embodiment.

The control unit 234 includes a detection threshold changing unit 2341, the channel processing unit 2142, and the synchronization processing unit 2143. That is, the control unit 234 includes the detection threshold changing unit 2341 instead of the detection threshold changing unit 2141 of the control unit 214 (FIG. 3). Illustration of the user interface 216 is omitted in FIG. 18.

The detection threshold changing unit 2341 determines a detection threshold on the basis of the location information input thereto as the use environment information from the GPS reception unit 233.

The memory unit 215 pre-stores detection-threshold correspondence information in which the location information serving as the use environment information and the detection threshold are associated with each other. An example of the detection-threshold correspondence information will be described later.

The detection threshold changing unit 2341 reads detection threshold information corresponding to the input location information from the detection-threshold correspondence information stored in the memory unit 215, and outputs the read detection threshold information to the channel processing unit 2142. In this way, the detection threshold is set in the channel processing unit 2142.

(Example of Detection-Threshold Correspondence Information)

Next, an example of the detection-threshold correspondence information according to the present embodiment will be described.

FIG. 19 is a diagram illustrating an example of the detection-threshold correspondence information according to the present embodiment.

In FIG. 19, the left column shows the location information serving as the use environment information, and the right column shows the detection threshold information.

The second row indicates that pieces of location information AP and BP are associated with the detection threshold D. The third row indicates that location information other than AP and BP is associated with the detection threshold E. Accordingly, in the case where the location information AP is input thereto from the GPS reception unit 233, the detection threshold changing unit 2341 sets the detection threshold D. In the case where location information (for example, CP) other than the pieces of location information AP and BP is input thereto from the GPS reception unit 233, the detection threshold changing unit 2341 sets the detection threshold E. In the case where no location determination signal reaches an outdoor place, an underground mall, or the like from the GPS satellite, the detection threshold changing unit 2341 also sets the detection threshold E corresponding to the other location information.

Now, it is assumed that locations represented by the pieces of location information AP and BP are included in an area in which a network that can be used by the mobile station apparatus 23 is operated and the detection threshold D (for example, −105 (dBm)) is smaller than the detection threshold E (for example, −90 (dBm)).

When the mobile station apparatus 23 is located within an area in which the usable network is operated, for example, at AP, channel selection can be made more likely to be successful using a weak received signal even if the mobile station apparatus 23 is located at a location where a radio wave is difficult to reach (for example, a remote location) from the base station apparatus 11.

On the other hand, when the mobile station apparatus 23 is operating in an area in which the usable network is not operated, such as at CP, the detection threshold E higher than the detection threshold D is selected. This configuration can prevent the mobile station apparatus 23 from erroneously selecting noise, for example, ambient noise or white noise, or a received signal from another system.

(Channel Selection Process)

Next, a channel selection process according to the present embodiment will be described.

FIG. 20 is a flowchart illustrating a channel selection process according to the present embodiment.

The channel selection process illustrated in FIG. 20 includes steps S151 and S152 instead of steps S101 and S102 of the channel selection process illustrated in FIG. 7.

(Step S151) The GPS reception unit 233 calculates the location of the mobile station apparatus 23 on the basis of the location determination signal input thereto from the GPS antenna 232, and generates the location information representing the calculated location.

Then, the process proceeds to step S152.

(Step S152) The detection threshold changing unit 2341 reads the detection threshold information corresponding to the location information input thereto from the GPS reception unit 233 from the detection-threshold correspondence information stored in the memory unit 215, and sets the read detection threshold information in the channel processing unit 2142. Then, the process proceeds to step S103.

In this way, channel selection can be made more likely to be successful for a frequency band used at the location. Also, for other frequency bands, erroneous selection of a received signal such as noise can be prevented. Also, by performing such control for each location, control can be performed in a more detailed manner than in the case of using the country information.

Note that in the present embodiment, in the detection-threshold correspondence information stored in the memory unit 215, the location information may be associated with area's frequency band information which represents a frequency band used in an area including the location. In such a case, the detection threshold changing unit 2341 selects detection threshold information (for example, the detection threshold D) for area's frequency band information (for example, the 800-MHz band) associated with an area including the location represented by the input location information. For other frequency bands that can be used by the mobile station apparatus 23 (for example, a 900-MHz band, a 1800-MHz band, and a 1900-MHz band), the detection threshold changing unit 2341 may determine a detection threshold (for example, the detection threshold E) that is higher than a value represented by the detection threshold information associated with the area including the location represented by the location information by a predetermined value.

In this way, channel selection can be made more likely to be successful for a frequency band used at the determined location. Also, erroneous selection of a received signal such as noise can be prevented for the other frequency bands.

(Example of Received Signal Strength Information)

Next, an example of the received signal strength information will be described.

Figure 21:
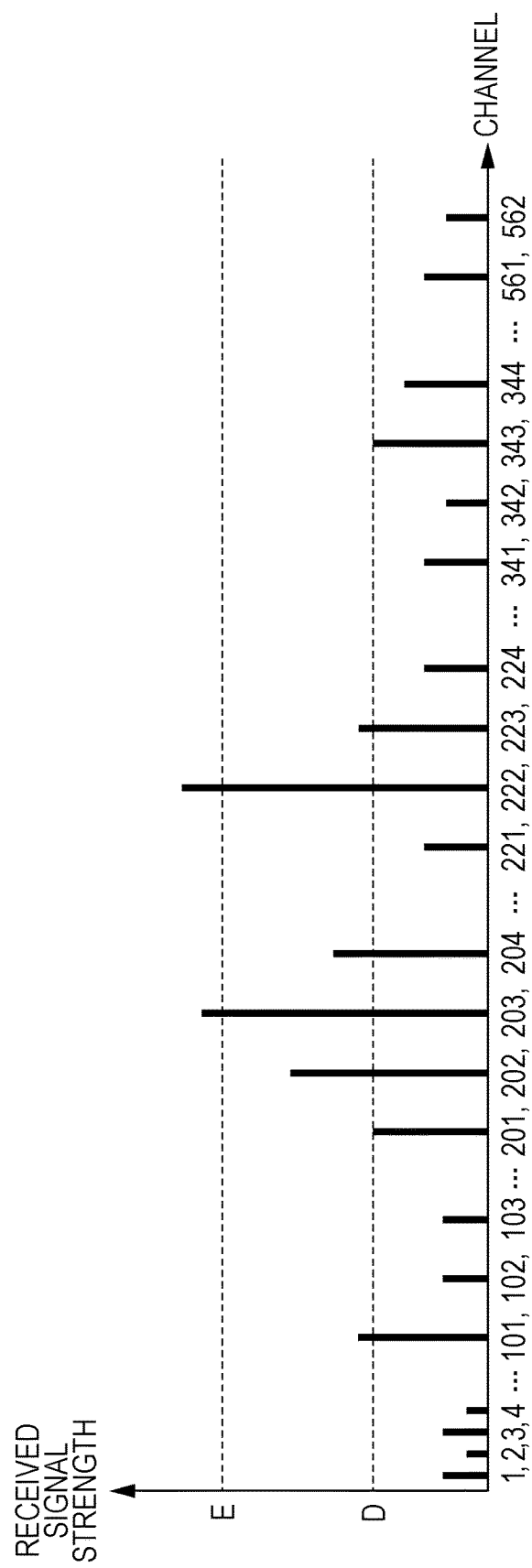
FIG. 21 is a diagram illustrating an example of received signal strength information.

FIG. 21 is a diagram illustrating an example of the received signal strength information.

In FIG. 21, the horizontal axis represents the channel, and the vertical axis represents the received signal strength. The received signal strength illustrated in FIG. 21 is the same as the corresponding received signal strength illustrated in FIG. 6.

For example, when the input location information is CP, the detection threshold changing unit 2341 selects the detection threshold E (for example, −90 (dBm)). The channel processing unit 2142 selects channels having a received signal strength higher than the detection threshold E from among receivable channels. In this case, combinations of the selected channel and the received signal distance are those for two channels, i.e., (203, −88 (dBm)) and (222, −85 (dBm)). When the input location information is AP, the detection threshold changing unit 2341 selects the detection threshold D (for example, −105 (dBm)). The channel processing unit 2142 selects channels having a received signal strength higher than the detection threshold D from among receivable channels. In this case, combinations of the selected channel and the received signal distance are those for six channels, i.e., (101, −104 (dBm)), (202, −98 (dBm)), (203, −88 (dBm)), (204, −99 (dBm)), (222, −85 (dBm)), and (223, −94 (dBm)).

By determining the detection threshold in accordance with the location information in this way, the number of to-be-selected channels can be controlled.

Note that the case where the location information is input to the detection threshold changing unit 2341 from the GPS reception unit 233 every time a cell search is performed has been described above as an example; however, the present embodiment is not limited to this case. In the case where the mobile station apparatus 23 is located in an out-of-service area of the base station apparatus 11 for a period longer than a predetermined period, the GPS reception unit 233 may stop outputting the location information to the detection threshold changing unit 2341 at certain intervals. In the case where the GPS reception unit 233 stops outputting the location information, the channel processing unit 2142 performs the channel selection process on the basis of the detection threshold information determined using the previously input location information until the location information is output next.

Next, an example of timings of individual processes (location determination, a channel selection process, and a synchronization process) of a cell search will be described.

Figure 22:
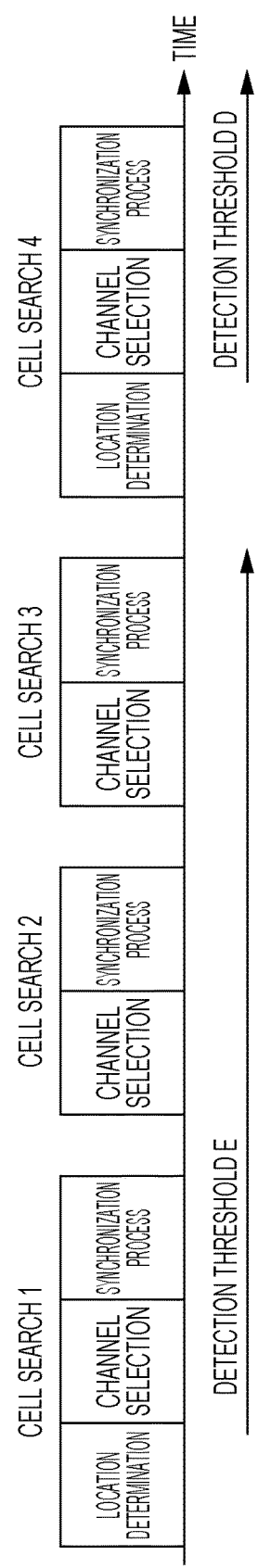
FIG. 22 is a conceptual diagram illustrating an example of timings of individual processes of a cell search.

FIG. 22 is a conceptual diagram illustrating an example of timings of individual processes of a cell search.

In FIG. 22, the horizontal axis represents time, and indicates that the cell search has been performed four times. The four cell searches are referred to as, from the oldest cell search, a cell search 1, a cell search 2, a cell search 3, and a cell search 4. In this example, location determination is performed for the first cell search of every three cell searches (cell searches 1, 4, . . . ), and location determination is not performed for the other two cell searches (cell searches 2, 3, . . . ). In this way, the detection threshold (for example, the detection threshold E) is obtained on the basis of the location information obtained in location determination of the cell search 1, and the obtained detection threshold is used in the channel selection process of the cell searches 1, 2, and 3. Also, the detection threshold (for example, the detection threshold D) is obtained on the basis of new location information obtained in location re-determination of the cell search 4, and the obtained detection threshold is used in the channel selection process of the cell searches 4, 5, and 6.

FIG. 22 illustrates an example in which the GPS reception unit 233 obtains and outputs the location information at a certain cell-search cycle (for example, once every three cell searches); however, the GPS reception unit 233 may obtain and output the location information at certain time intervals (for example, 30 minutes).

As described above, in the present embodiment, by setting the detection threshold on the basis of the location information, a possibility that the minimum number of channels to be subjected to the synchronization process is to be selected is left and the number of to-be-selected channels is reduced, whereby the time and power consumption for the synchronization process can be reduced.

(Modification 2-1)

Next, a modification 2-1 of the present embodiment will be described. In the present modification, when the location information is input thereto from the GPS reception unit 233, the detection threshold changing unit 2341 stores the input location information in the memory unit 215. The detection threshold changing unit 2341 may store the location information as part of the located area history information every time the input from the GPS reception unit 233 is started. In the case where the location information is not input from the GPS reception unit 233, the detection threshold changing unit 2341 reads the latest location information stored in the memory unit 215, and outputs the read location information to the channel processing unit 2142. In this way, even if a location determination signal does not reach an outdoor place, an underground mall, or the like from a GPS satellite, the detection threshold changing unit 2341 can determine the detection threshold on the basis of the latest location information stored in the memory unit 215.

Next, a channel selection process according to the present modification will be described.

Figures 23, 24:
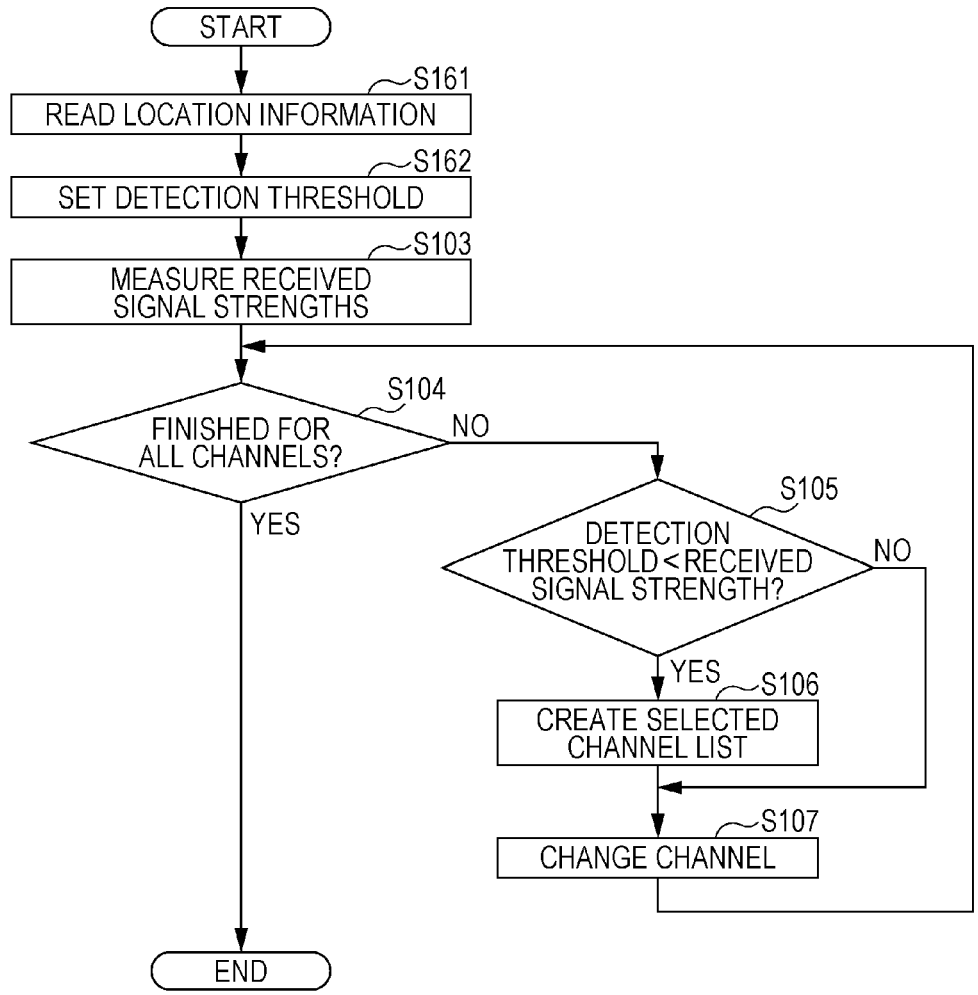
FIG. 23 is a flowchart illustrating an example of a channel selection process according to a modification 2-1 of the present embodiment.
FIG. 24 is a diagram illustrating an example of detection-threshold correspondence information according to a modification 2-2 of the present embodiment.

FIG. 23 is a flowchart illustrating an example of a channel selection process according to the present modification.

The channel selection process according to the present modification includes steps S161 and S162 instead of steps S101 and S102 of the channel selection process illustrated in FIG. 7.

(Step S161) In the case where the location information is input thereto from the GPS reception unit 233, the detection threshold changing unit 2341 stores the input location information in the memory unit 215. In the case where the location information is not input from the GPS reception unit 233, the detection threshold changing unit 2341 reads the location information stored in the memory unit 215. The detection threshold changing unit 2341 extracts the latest location information entry from the read location information. Then, the process proceeds to step S162.

(Step S162) The detection threshold changing unit 2341 reads the detection threshold information corresponding to the location information input thereto from the GPS reception unit 233 or the location information read from the memory unit 215 from the detection-threshold correspondence information stored in the memory unit 215, and outputs the read detection threshold information to the channel processing unit 2142. Then, the process proceeds to step S103.

As described above, in the present modification, even in the case where the location information is not input from the GPS reception unit 233, the detection threshold can be set on the basis of the latest input location information. In this way, a possibility that the minimum number of channels to be subjected to the synchronization process is to be selected is left and the number of to-be-selected channels is reduced, whereby the time or power consumption for the synchronization process can be reduced.

(Modification 2-2)

Next, a modification 2-2 of the present embodiment will be described. In the present modification, the detection threshold changing unit 2341 determines, for each use environment information, that is, for each location information, a priority in accordance with a use state thereof, and determines the detection threshold such that the higher the determined priority, the lower the detection threshold.

The detection threshold changing unit 2341 counts, for each location represented by the location information read from the memory unit 215, the number of times the location has been stored. Then, the detection threshold changing unit 2341 determines a priority for each location information such that the priority becomes higher for a location having a larger count.

For example, in the case where the read pieces of location information AP and BP are included four times and twice, respectively, the detection threshold changing unit 2341 determines the priority such that the priority for the location information AP becomes higher than the priority for the location information BP. Here, the priorities for the pieces of location information AP and BP are referred to as priorities 1 and 2, respectively.

The detection threshold changing unit 2341 reads the detection threshold information corresponding to the determined priority from the memory unit 215. For locations except for the location represented by the extracted location information among the locations that can be used by the mobile station apparatus 23, the detection threshold changing unit 2341 reads the detection threshold information corresponding to the other location information from the memory unit 215. Here, in the detection-threshold correspondence information pre-stored in the memory unit 215, detection threshold information representing a lower detection threshold is associated with a higher priority. Also, for the other location information, detection threshold information representing the highest detection threshold is associated because the priority is low.

Next, an example of the detection-threshold correspondence information according to the present modification will be described.

FIG. 24 is a diagram illustrating an example of the detection-threshold correspondence information according to the present modification.

In FIG. 24, the left column shows the location information serving as the use environment information, and the right column shows the detection threshold information.

The second row indicates that the detection threshold D assigned the highest priority 1 is associated with the location information AP. The third row indicates that the detection threshold F assigned the next highest priority 2 is associated with the location information BP. The fourth row indicates that the detection threshold E is associated with priority information other than those for AP and BP. Also, as in the above-described modifications, in the case where the location information is unknown, the detection threshold E is given. In this example, the detection threshold is in the order of D<F<E. With this configuration, even a weak radio wave can be easily detected for a location represented by a location information assigned a high priority, detection of noise or the like is avoided for a location represented by a location information assigned the lowest priority, and a possibility of detecting a strong received signal from the base station apparatus is left.

Next, an example of the detection threshold information selected in the present modification will be described.

Figure 25:
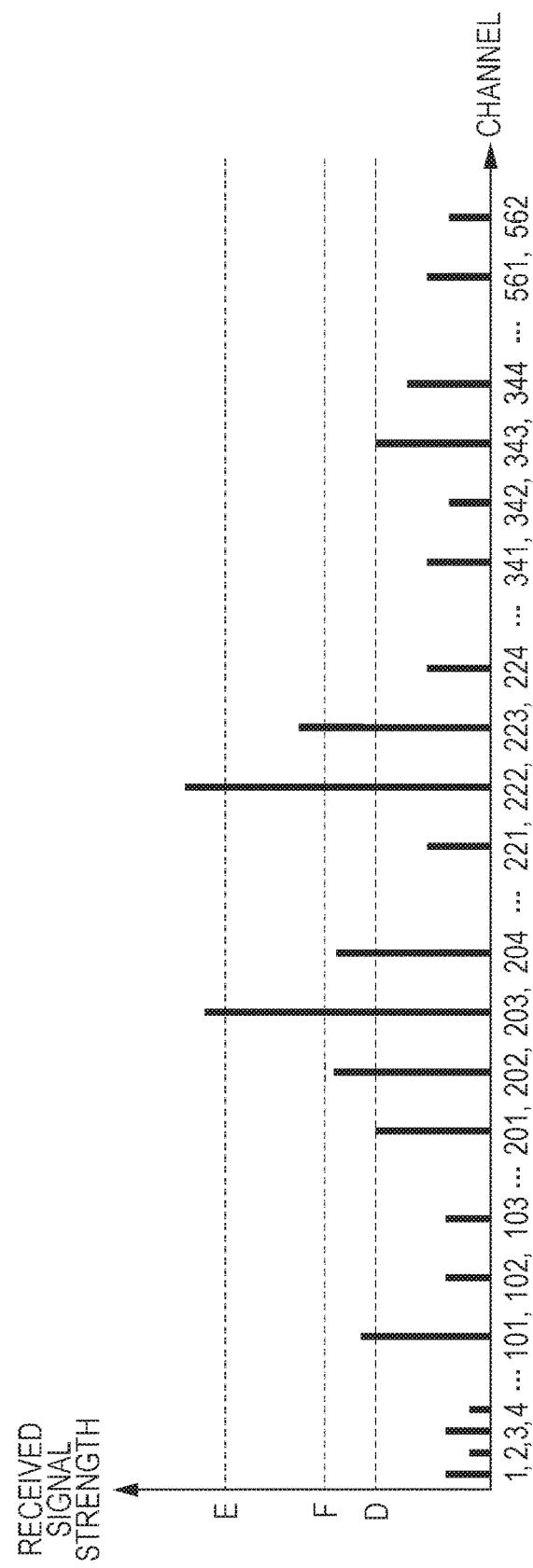
FIG. 25 is a diagram illustrating an example of detection threshold information according to the present modification.

FIG. 25 is a diagram illustrating an example of the detection threshold information according to the present modification.

In FIG. 25, the horizontal axis represents the channel, and the vertical axis represents the received signal strength.

Dashed lines represent the detection thresholds E, F, and D associated with the priorities 1 and 2, and the others, respectively. The received signal strength of each channel illustrated in FIG. 25 is the same as the corresponding received signal strength illustrated in FIG. 6.

When the location information AP is obtained and the detection threshold D is −105 (dBm), the channel processing unit 2142 selects the following six channels. Combinations of the selected channel and the received signal strength are (101, −104 (dBm)), (202, −98 (dBm)), (203, −88 (dBm)), (204, −99 (dBm)), (222, −85 (dBm)), and (223, −94 (dBm)).

When the location information BP is obtained and the detection threshold F is −95 (dBm), the channel processing unit 2142 selects the following three channels. Combinations of the selected channel and the received signal strength are (203, −88 (dBm)), (222, −85 (dBm)), and (223, −94 (dBm)).

When the other location information is obtained and the detection threshold E is the highest, that is, −90 (dBm), the channel processing unit 2142 selects the following two channels. Combinations of the selected channel and the received signal strength are (203, −88 (dBm)) and (222, −85 (dBm)). Accordingly, because a higher detection threshold is selected for a lower priority, the number of to-be-selected channels is reduced. Here, for the location information AP, the synchronization process is attempted up to eight times, and thus the mobile station apparatus is more likely to be located within the cell 11c of the base station apparatus 11. On the other hand, for the other location information, the detection threshold is set to be higher by setting the priority to be lower. Consequently, the number of selected channel is two, and the number of times the synchronization process is attempted is reduced to twice. Therefore, the power consumption of the mobile station apparatus 23 can be suppressed.

The case where the detection threshold changing unit 2341 determines the priority in accordance with the number of times each location information has been obtained has been described above as an example; however, the present modification is not limited to this example. The detection threshold changing unit 2341 may determine the priority in accordance with a distance from a base station, on the basis of the location information input thereto from the GPS reception unit 233. For example, the GPS reception unit 233 receives, from a GPS satellite, base station location information which represents the location of the base station apparatus 11, and outputs the received base station location information to the detection threshold changing unit 2341. The detection threshold changing unit 2341 calculates a distance from the mobile station apparatus 23 to the base station location represented by the base station location information input thereto from the GPS reception unit 233. The detection threshold changing unit 2341 may determine the priority such that the priority becomes higher as the calculated distance becomes larger so as to determine a lower detection threshold. In this way, even in the case where the mobile station apparatus 23 is located at a mountain, ocean, a plain, or the like, the mobile station apparatus 23 can detect the base station apparatus 11 located far away from the mobile station apparatus 23.

Also, in the case where the calculated distance is smaller than a certain distance threshold, the detection threshold changing unit 2341 may set the priority to an intermediate level (for example, the second highest level among three levels), that is, the detection threshold to an intermediate level. With this configuration, even in the case where relatively small-scale base station apparatuses are densely arranged in an urban area, an underground mall, or the like, the mobile station apparatus 23 selects only a base station apparatus having a high reception strength from among many base station apparatuses. Also, in the case where the base station location information is not input, it is estimated that the current area is an area where no usable base station apparatus is located. Thus, the detection threshold changing unit 2341 sets the priority corresponding to the other location to the lowest level among the plurality of levels, that is, the detection threshold to the highest level.

As described above, in the present modification, the detection threshold is set in accordance with the priority which is determined on the basis of the use state of each location information serving as the use environment. With this configuration, a possibility that the minimum number of channels to be subjected to the synchronization process is to be selected is left by setting the detection threshold to be high for the location information assigned a low priority, and the time and power consumption for the synchronization process to be performed next can be reduced by reducing the number of to-be-selected channels.

As described above, in the present embodiment, the location of the mobile station apparatus 23 is determined, and the detection threshold used for detecting a reception wave is determined on the basis of the determined location. With this configuration, channel detection based on the location of the mobile station apparatus 23 is enabled and an unnecessary synchronization process and power consumption can be reduced.

Third Embodiment

Next, a third embodiment of the present invention will be described. Configurations that are the same as those of the above-described embodiments are denoted by the same reference signs, and the description is incorporated herein by reference.

A communication system 3 (not illustrated) according to the present embodiment includes a mobile station apparatus 24 instead of the mobile station apparatus 21 of the communication system 1 (FIG. 1). Now, a configuration of the mobile station apparatus 24 will be described.

Figure 26:
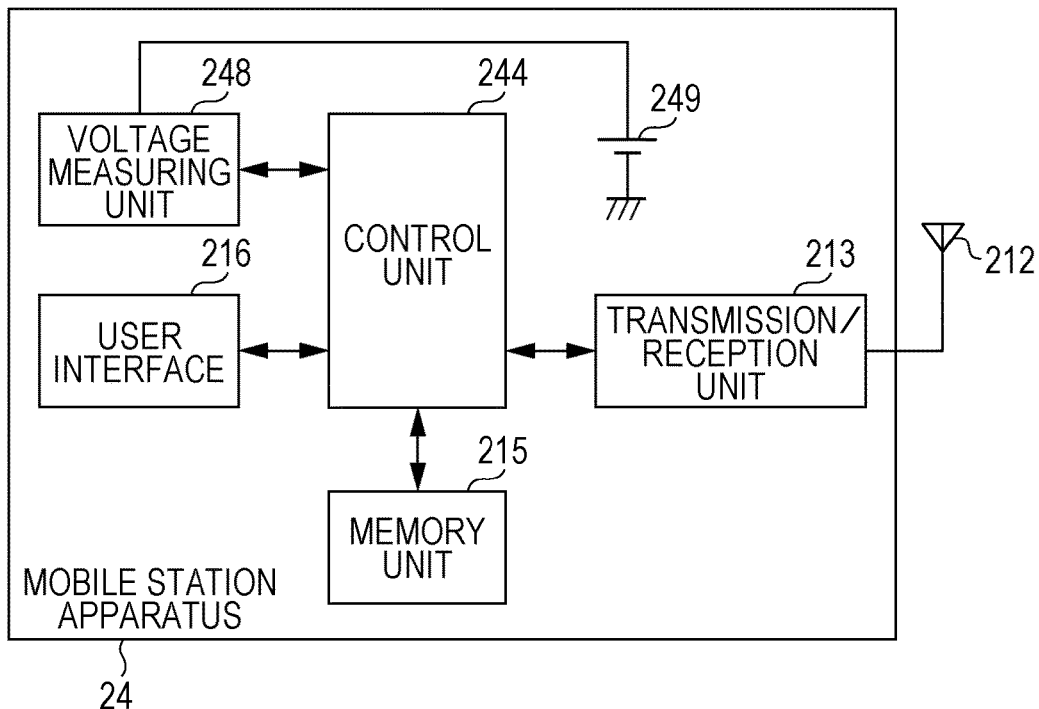
FIG. 26 is a schematic block diagram illustrating a configuration of a mobile station apparatus according to a third embodiment of the present invention.

FIG. 26 is a schematic block diagram illustrating a configuration of the mobile station apparatus 24 according to the present embodiment.

The mobile station apparatus 24 includes the antenna 212, the transmission/reception unit 213, the memory unit 215, the user interface 216, a control unit 244, a voltage measuring unit 248, and a power supply 249.

That is, the mobile station apparatus 24 includes the control unit 244 instead of the control unit 214 of the mobile station apparatus 21 (FIG. 2) and further includes the voltage measuring unit 248 and the power supply 249.

The voltage measuring unit 248 measures a voltage at a positive terminal of the power supply 249, and outputs voltage information which represents the measured voltage to a detection threshold changing unit 2441 of the control unit 244. The voltage measuring unit 248 is, for example, an analog-to-digital converter (A/D converter).

The power supply 249 supplies direct-current power necessary for operation to the individual components 212, 213, 215, 216, 244, and 248 of the mobile station apparatus 24. The power supply 249 is a secondary battery that is rechargeable, and is, for example, a lithium-ion battery. The power supply 249 includes a positive terminal and a negative terminal. The positive terminal is connected to the voltage measuring unit 248. The negative terminal is grounded.

Next, a configuration of the control unit 244 according to the present embodiment will be described.

Figure 27:
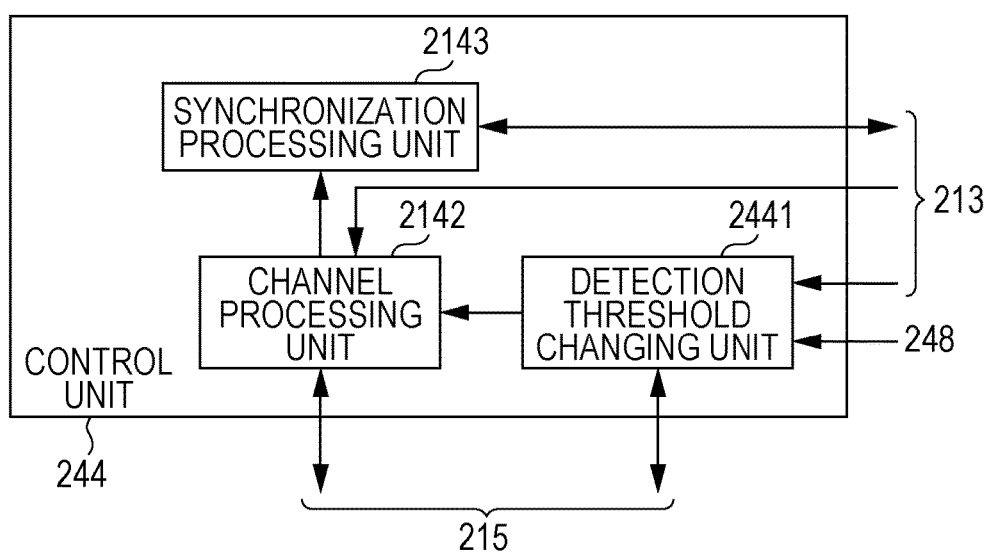
FIG. 27 is a schematic block diagram illustrating a configuration of a control unit according to the present embodiment.

FIG. 27 is a schematic block diagram illustrating a configuration of the control unit 244 according to the present embodiment.

The control unit 244 includes the detection threshold changing unit 2441, the channel processing unit 2142, and the synchronization processing unit 2143. That is, the control unit 244 includes the detection threshold changing unit 2441 instead of the detection threshold changing unit 2141 of the control unit 214 (FIG. 3).

The detection threshold changing unit 2441 determines a detection threshold on the basis of the voltage information input thereto as the use environment information from the voltage measuring unit 248.

The memory unit 215 pre-stores detection-threshold correspondence information in which the voltage information serving as the use environment information and the detection threshold are associated with each other. An example of the detection-threshold correspondence information will be described later.

The detection threshold changing unit 2441 reads detection threshold information corresponding to the input voltage information from the detection-threshold correspondence information stored in the memory unit 215, and outputs the read detection threshold information to the channel processing unit 2142. In this way, the detection threshold is set in the channel processing unit 2142.

(Example of Detection-Threshold Correspondence Information)

Next, an example of the detection-threshold correspondence information according to the present embodiment will be described.

Figures 28, 29:
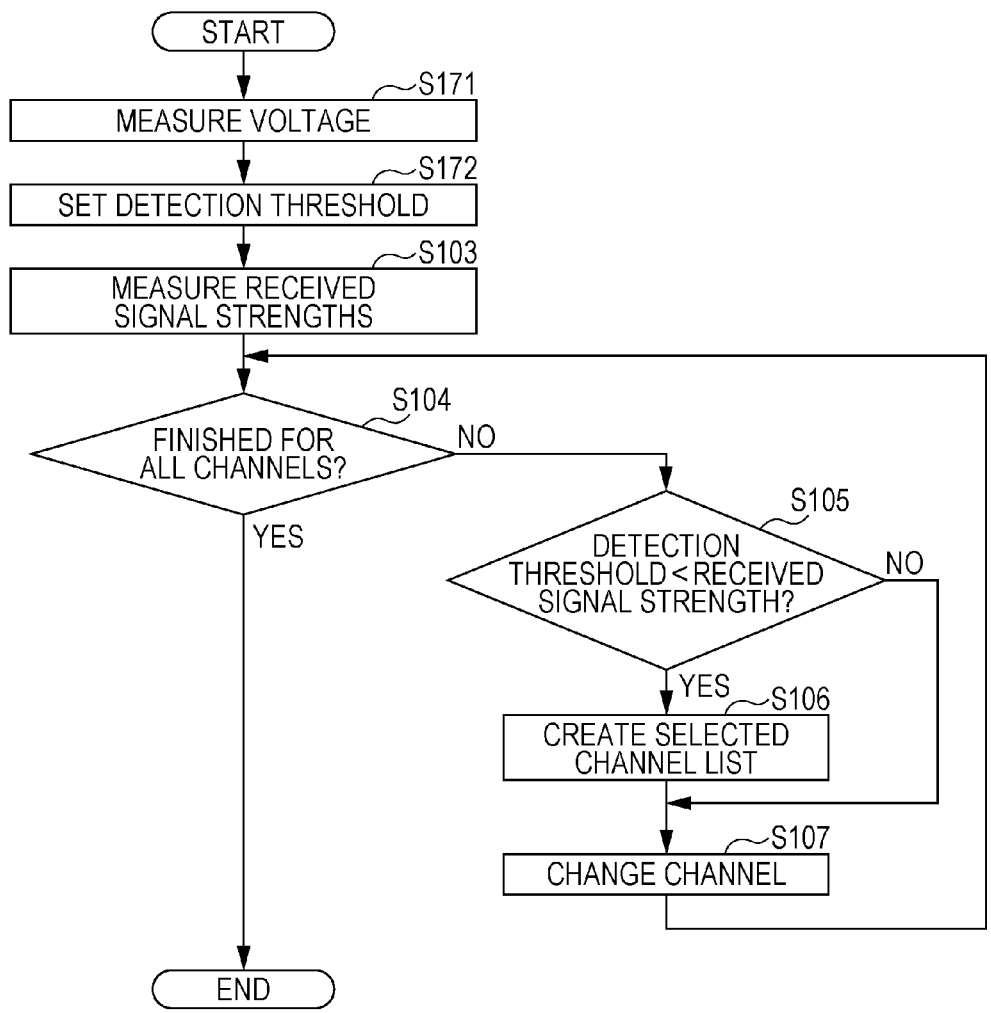
FIG. 28 is a diagram illustrating an example of detection-threshold correspondence information according to the present embodiment.
FIG. 29 is a flowchart illustrating a channel selection process according to the present embodiment.

FIG. 28 is a diagram illustrating an example of the detection-threshold correspondence information according to the present embodiment.

In FIG. 28, the left column shows the voltage information serving as the use environment information, and the right column shows the detection threshold information.

The second row indicates that voltages exceeding a predetermined voltage V1 (for example, 3.7 V) are associated with the detection threshold D. The third row indicates that other voltages, that is, voltages equal to the voltage V1 or lower than the voltage V1, are associated with the detection threshold E. Accordingly, in the case where the voltage information representing a voltage (for example, 4.0 V) higher than the voltage V1 is input from the voltage measuring unit 248, the detection threshold changing unit 2441 sets the detection threshold D. In the case where the voltage information representing a voltage (for example, 3.4 V) that is equal to the voltage V1 or lower than the voltage V1 is input from the voltage measuring unit 248, the detection threshold changing unit 2441 sets the detection threshold E.

Here, a voltage that is high enough for the mobile station apparatus 24 to operate is preset as the voltage V1 and the detection threshold D (for example, −105 (dBm)) is set to be lower than the detection threshold E (for example, −90 (dBm)). In the case where voltage information representing a voltage higher than the voltage V1 is input from the voltage measuring unit 248, that is, in the case where an remaining amount of electric charges stored in the power supply 249 is sufficient, the detection threshold D is set so as to allow more channels to be selected and make a cell search be more likely to be successful. On the other hand, voltage information representing a voltage equal to the voltage V1 or lower than the voltage V1 is input from the voltage measuring unit 248, that is, a remaining amount of electric charges stored in the power supply 249 is insufficient, the detection threshold E is set so as to allow only the minimum number of channels having strong radio wave strengths to be selected and to suppress power consumption without completely eliminating the possibility of the synchronization process.

Next, a channel selection process according to the present embodiment will be described.

FIG. 29 is a flowchart illustrating a channel selection process according to the present embodiment.

The channel selection process according to the present embodiment includes steps S171 and S172 instead of steps S101 and S102 of the channel selection process illustrated in FIG. 7.

(Step S171) The voltage measuring unit 248 measures a voltage at the positive terminal of the power supply 249, and outputs voltage information representing the measured voltage to the detection threshold changing unit 2441.

Then, the process proceeds to step S172.

(Step S172) The detection threshold changing unit 2441 reads the detection threshold information corresponding to the voltage information input thereto from the voltage measuring unit 248 from the detection-threshold correspondence information stored in the memory unit 215, and outputs the read detection threshold information to the channel processing unit 2142. Then, the process proceeds to step S103.

As described above, in the present embodiment, the detection threshold can be set to be higher as the voltage of the power supply 249, that is, the remaining amount of electric charges stored in the power supply 249, becomes smaller. With this configuration, a possibility that the minimum number of channels to be subjected to the synchronization process is to be selected is left and the number of to-be-selected channels is reduced when the remaining amount of the battery becomes small, whereby the time and power consumption for the synchronization process can be reduced.

FIG. 30 is a diagram illustrating another example of the detection-threshold correspondence information according to the present embodiment.

In FIG. 30, the left column shows the voltage information serving as the use environment information, and the right column shows the detection threshold information. The second row of FIG. 30 indicates that if a voltage represented by the voltage information is higher than the voltage V1, the voltage is associated with the detection threshold D. The third row of FIG. 30 indicates that if a voltage represented by the voltage information is higher than a voltage V2 and is equal to the voltage V1 or lower than the voltage V1, the voltage is associated with the detection threshold F. The fourth row of FIG. 30 indicates that if a voltage represented by the voltage information is equal to the voltage V2 or lower than the voltage V2, the voltage is associated with the detection threshold E. Here, the detection threshold is in the order of D<F<E.

As described above, in the present embodiment, the voltage of the power supply of the mobile station apparatus 24 is measured, and the detection threshold used for detecting a reception wave is determined on the basis of the measured voltage. In this way, channel detection based on the remaining amount of electric charges stored in the power supply is enabled and an unnecessary synchronization process and power consumption can be reduced.

Fourth Embodiment

Next, a fourth embodiment of the present invention will be described. Configurations that are the same as those of the above-described embodiments are denoted by the same reference signs, and the description is incorporated herein by reference.

A communication system 4 (not illustrated) according to the present embodiment includes a mobile station apparatus 25 instead of the mobile station apparatus 21 of the communication system 1 (FIG. 1). Now, a configuration of the mobile station apparatus 25 will be described.

FIG. 31 is a schematic block diagram illustrating a configuration of the mobile station apparatus 25 according to the present embodiment.

The mobile station apparatus 25 includes the antenna 212, the transmission/reception unit 213, the memory unit 215, the user interface 216, and a control unit 254. That is, the mobile station apparatus 25 includes the control unit 254 instead of the control unit 214 of the mobile station apparatus 21 (FIG. 2).

FIG. 32 is a schematic block diagram illustrating a configuration of the control unit 254 according to the present embodiment.

The control unit 254 includes a detection threshold changing unit 2541, the channel processing unit 2142, and the synchronization processing unit 2143. That is, the control unit 254 includes the detection threshold changing unit 2541 instead of the detection threshold changing unit 2141 of the control unit 214 (FIG. 3). In FIG. 32, illustration of the user interface 216 is omitted.

The detection threshold changing unit 2541 updates a detection threshold determined for each use environment information in accordance with the number of times the cell search has been performed or a duration of the state in which the mobile station apparatus 25 is unable to perform communication after being located in an out-of-service area of the cell 11c or the like. This duration is hereinafter referred to as an out-of-service duration.

The detection threshold changing unit 2541 counts the number of iterations of the cell search performed by the synchronization processing unit 2143. Here, the detection threshold changing unit 2541 increases (increments) the number of iterations of the cell search by one every time step S120 (FIG. 8) is finished, for example. Note that the initial value of the number of iterations of the cell search is 1.

In the case where the number of iterations of the cell search is 1, the detection threshold changing unit 2541 determines the detection threshold in the same manner as the detection threshold changing unit 2141 (FIG. 3). Note that in the case where the number of iterations of the cell search is more than 1, the detection threshold changing unit 2541 decreases, for example, the already determined detection threshold by a predetermined amount of change α (for example, 5 (dBm)) in step S102 (FIG. 7). In this way, the detection threshold is decreased by α every time the number of iterations of the cell search is increased by one. The detection threshold changing unit 2541 may repeatedly perform the process for decreasing the detection threshold until the detection threshold reaches a predetermined lower limit (for example, −120 (dBm)) or the number of iterations reaches a predetermined number of iterations (for example, four times).

After the mobile station apparatus 21 (FIG. 2) is located in an out-of-service area of the cell 11c or the like, the cell search is repeatedly performed without updating of the located area history information indicating that the user has not moved, and the power may be unnecessarily consumed. In contrast, by decreasing the detection threshold in accordance with the number of iterations of the cell search or the out-of-service duration as in the mobile station apparatus 25, sensitivity for a received signal can be increased and an effective channel can be detected.

Next, an example of how the detection threshold information according to the present embodiment is changed will be described.

Figure 33:
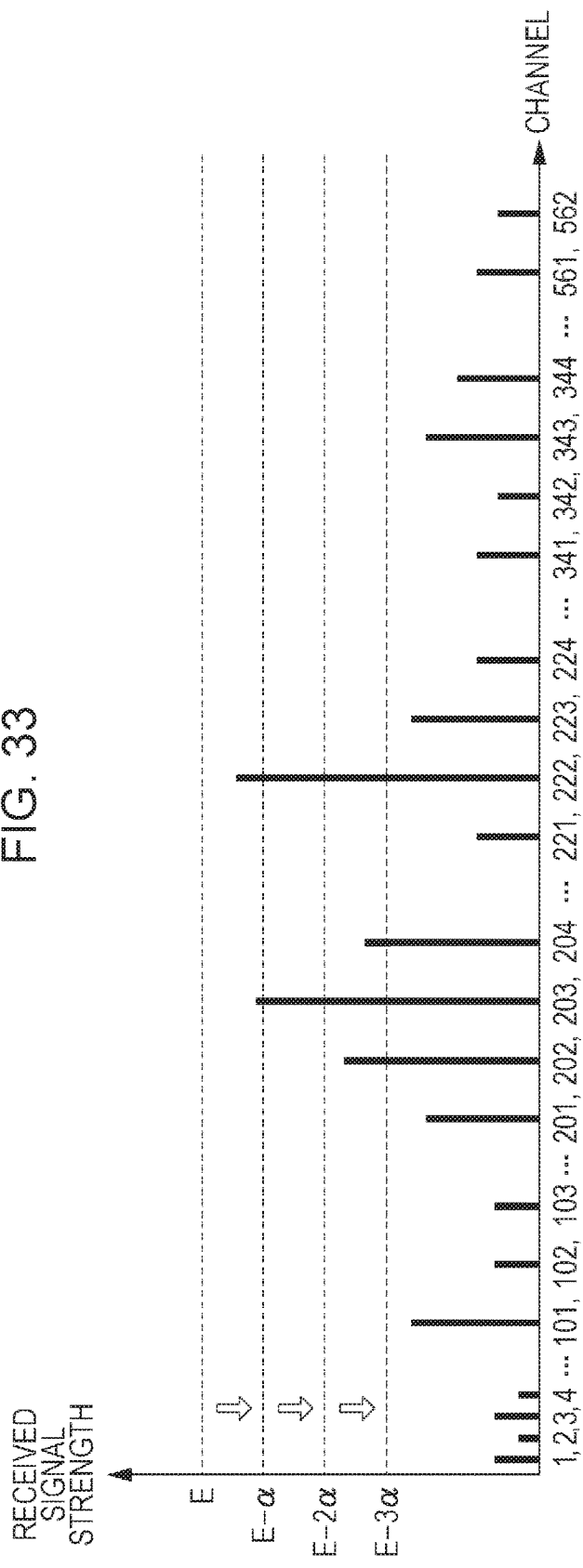
FIG. 33 is a diagram illustrating an example of received signal strength information.

FIG. 33 is a diagram illustrating an example of the received signal strength information.

In FIG. 33, the horizontal axis represents the channel, and the vertical axis represents the received signal strength. On the vertical axis, E, E−α, E−2α, and E−3α are shown as examples of the detection thresholds for the numbers of iterations of 1, 2, 3, and 4, respectively. The received signal strength of each channel illustrated in FIG. 33 is the same as the corresponding one illustrated in FIG. 6. FIG. 33 indicates that as the detection threshold is decreased to E, E−α, E−2α, and E−3α, the number of channels exceeding this detection threshold, that is, the number of selected channels increases to 0, 2, 2, and 4, respectively.

Figure 34:
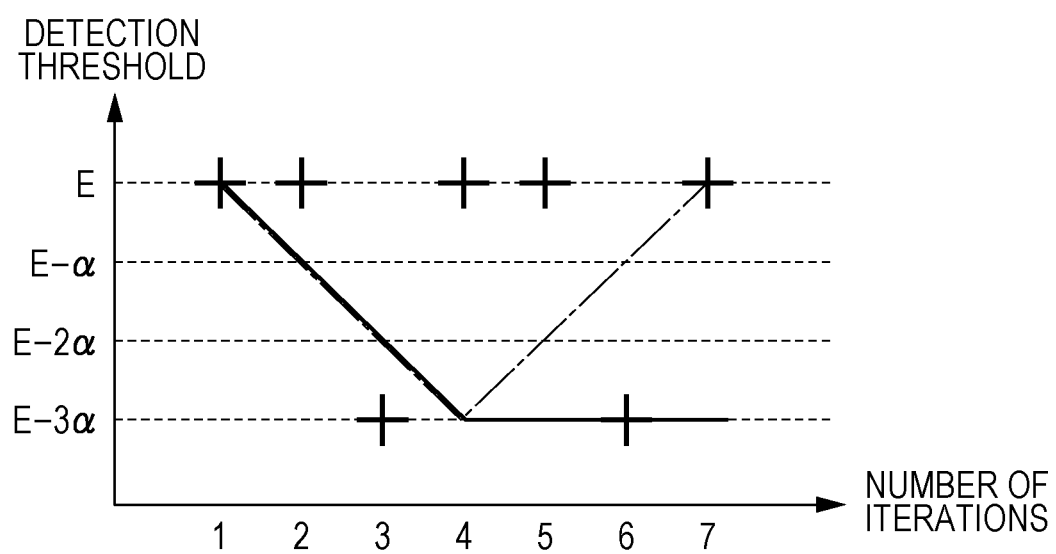
FIG. 34 is a diagram illustrating an example of how detection threshold information according to the present embodiment changes.

FIG. 34 is a diagram illustrating an example of how the detection threshold information according to the present embodiment is changed.

In FIG. 34, the horizontal axis represents the number of iterations of the cell search, and the vertical axis represents the detection threshold.

In FIG. 34, a solid line indicates that the initial value of the detection threshold is E, and after the detection threshold has reached the predetermined lower limit of E−3α (or the number of iterations has reached four times), the detection threshold changing unit 2541 maintains the detection threshold without changing it.

In FIG. 34, a dot-and-dash line indicates that the initial value of the detection threshold is E, and after the detection threshold has reached the predetermined lower limit of E−3α (or the number of iterations has reached four times), the detection threshold changing unit 2541 increases the detection threshold by the predetermined amount of change α at every iteration of the cell search. In this case, the detection threshold changing unit 2541 may repeatedly perform the process for increasing the detection threshold until the detection threshold reaches a predetermined upper limit (for example, the initial value E). In this way, in the case where the user has moved to a location where the reception strength of a received signal from the base station apparatus 11 is strong, detection of an unnecessary channel is avoided and the processing time and power consumption can be reduced.

Alternatively, the detection threshold changing unit 2541 may determine the detection threshold at every iteration such that the lower limit appears at least once at a certain cycle of the number of iterations of the cell search (for example, once every four cell searches). In the example illustrated in FIG. 34, during a cycle composed of three iterations indicated by + symbols, the detection threshold is determined to be E at the first and second iterations and the detection threshold is determined to be E−3α at the third iteration. Note that, the detection threshold changing unit 2341 may determine the cycles of the number of iterations at which the detection threshold is determined to be the lower limit at random at a predetermined probability (for example, ¼). With this configuration, the processing time and power consumption are reduced as a whole, and it is ensured that a channel is more likely to be detected.

Note that the case where the detection threshold changing unit 2541 changes the detection threshold at each iteration of the cell search has been described above as an example; however, the detection threshold may be changed every time the out-of-service duration reaches a multiple of a certain time interval (for example, 10 minutes), instead of on the basis of the number of iterations. For example, in the case where the detection threshold changing unit 2541 determines the detection threshold to be E at the time when the mobile station apparatus 25 has exited to the out-of-service area of the cell 11c, the detection threshold changing unit 2541 may determine the detection threshold to be E−α, E−2α, E−3α, E−3α, E−3α, E−3α, and E−3α after 10 minutes, 20 minutes, 30 minutes, 40 minutes, 50 minutes, 60 minutes, and 70 minutes have passed as indicated by the solid line in FIG. 34, respectively. Alternatively, the detection threshold changing unit 2541 may determine the detection threshold at certain time intervals as indicated by the dot-and-hash line or + symbols in FIG. 34.

The case where the detection threshold changing unit 2541 changes the detection threshold over the entire band in accordance with the number of times the cell search has been performed or the out-of-service duration has been described above as an example; however, the present embodiment is not limited to this case. In the present embodiment, the detection threshold may be changed for a predetermined frequency band or a frequency band represented by the frequency band information included in the located area history information.

The case where the detection threshold changing unit 2541 includes a configuration for updating the detection threshold that is determined for each use environment information in accordance with the number of iterations of the cell search or the out-of-service duration in addition to the configuration of the detection threshold changing unit 2141 (FIG. 3) has been described above an example; however, the present embodiment is not limited to this case. The detection threshold changing unit 2541 may include the configuration for updating the detection threshold that is determined for each use environment information in accordance with the number of iterations of the cell search or the out-of-service duration described above in addition to the configuration of the detection threshold changing unit 2341 (FIG. 18) or 2441 (FIG. 27).

As described above, in the present embodiment, by changing the detection threshold in accordance with the number of times the cell search has been performed or the out-of-service duration, to-be-selected channels can be screened out and the processing and power consumption related to the synchronization process for unnecessary channels can be reduced.

Also, the case where the detection-threshold correspondence information used by the detection threshold changing unit 2141 (FIG. 3), 2341 (FIG. 18), 2441 (FIG. 27), or 2541 (FIG. 32) to determine the detection threshold includes pieces of detection threshold information representing two or three detection thresholds has been described as example in the above-described embodiments; however, the configuration is not limited to this case. In the above-described embodiments, the detection-threshold correspondence information may include pieces of detection threshold information representing multiple detection thresholds more than three, for example, four detection thresholds.

The above-described embodiments can also be carried out in the following aspects.

(1) A mobile station apparatus including: a detection threshold changing unit configured to determine a detection threshold used for detecting a reception wave from a base station apparatus, on the basis of use environment information that represents a use environment of the mobile station apparatus; a channel selecting unit configured to select a channel having a reception level higher than the detection threshold from among channels that constitute the reception wave; and a synchronization processing unit configured to perform a synchronization process on a reception wave of the channel selected by the channel selecting unit.

(2) The mobile station apparatus according to (1), wherein the use environment information includes country information regarding an area in which a network connected to the base station apparatus is operated, and the detection threshold changing unit is configured to change the detection threshold on the basis of the country information.

(3) The mobile station apparatus according to (1), wherein the use environment information includes carrier information regarding a carrier that operates a network connected to the base station apparatus, and the detection threshold changing unit is configured to change the detection threshold on the basis of the carrier information.

(4) The mobile station apparatus according to (1), wherein the use environment information includes frequency band information that represents a frequency band that is in operation in a network connected to the base station apparatus, and the detection threshold changing unit is configured to change the detection threshold on the basis of the frequency band information.

(5) The mobile station apparatus according to (1), wherein the use environment information includes location information of the mobile station apparatus, and the detection threshold changing unit is configured to change the detection threshold on the basis of the location information.

(6) The mobile station apparatus according to (1), further including: a voltage measuring unit configured to measure a voltage of a power supply of the mobile station apparatus, wherein the use environment information includes voltage information that represents the voltage measured by the voltage measuring unit, and the detection threshold changing unit is configured to change the detection threshold on the basis of the voltage information.

(7) The mobile station apparatus according to any of (1) to (6), further including: a storage unit configured to store history information regarding a history of the use environment information, wherein the history information includes a plurality of pieces of the use environment information, and the detection threshold changing unit is configured to change the detection threshold in accordance with individual use states of the plurality of pieces of the use environment information.

(8) The mobile station apparatus according to any of (1) to (7), wherein the detection threshold changing unit is configured to change the detection threshold in accordance with the number of times the synchronization processing unit has performed the synchronization process or a duration over which the mobile station apparatus is located outside an area over which a radio wave reaches from the base station apparatus.

(9) The mobile station apparatus according to any of (1) to (8), wherein the detection threshold changing unit is configured to select one detection threshold from among at least two predetermined detection threshold candidates, in accordance with the use environment information.

(10) An integrated circuit included in a mobile station apparatus, executing: a detection threshold changing step of changing a detection threshold used for detecting a reception wave from a base station apparatus, on the basis of use environment information that represents a use environment of the mobile station apparatus; a channel selecting step of selecting a channel having a reception level higher than the detection threshold from among channels that constitute the reception wave; and a synchronization processing step of performing a synchronization process on a reception wave of the channel selected in the channel selecting step.

(11) A communication method for a mobile station apparatus, including: a detection threshold changing step of changing a detection threshold used for detecting a reception wave from a base station apparatus, on the basis of use environment information that represents a use environment of the mobile station apparatus; a channel selecting step of selecting a channel having a reception level higher than the detection threshold from among channels that constitute the reception wave; and a synchronization processing step of performing a synchronization process on a reception wave of the channel selected in the channel selecting step.

(12) A communication program causing a computer of a mobile station apparatus to execute: a detection threshold changing step of changing a detection threshold used for detecting a reception wave from a base station apparatus, on the basis of use environment information that represents a use environment of the mobile station apparatus; a channel selecting step of selecting a channel having a reception level higher than the detection threshold from among channels that constitute the reception wave; and a synchronization processing step of performing a synchronization process on a reception wave of the channel selected in the channel selecting step.

According to the aspect of (1), (10), (11), or (12), the number of channels selected as targets of the synchronization process is reduced and the minimum number of channels are selected in accordance with the use environment of the mobile station apparatus. Accordingly, a possibility of restarting communication can be ensured and the processing time and power consumption for the synchronization process of a cell search can be reduced.

According to the aspect of (2), the number of selected channels is reduced in accordance with the country in which the network is operated in (1).

According to the aspect of (3), the number of selected channels is reduced in accordance with the carrier that operates the network in (1).

According to the aspect of (4), the number of selected channels is reduced in accordance with the frequency band that is in operation in the network in (1).

According to the aspect of (5), the number of selected channels is reduced in accordance with the location of the mobile station apparatus in (1).

According to the aspect of (6), the number of selected channels is reduced in accordance with the voltage of the power supply of the mobile station apparatus in (1).

According to the aspect of (7), the number of selected channels is reduced in accordance with individual use states of the plurality of use environments in any of (1) to (6).

According to the aspect of (8), the number of selected channels is reduced in accordance with the number of iterations of the synchronization process or the duration over which the mobile station apparatus is located outside the area over which a radio wave reaches from the base station apparatus in any of (1) to (7).

According to the aspect of (9), channels constituting the radio wave are selected at a sensitivity selected in accordance with the use environment of the mobile station apparatus in any of (1) to (8).

Note that part of the mobile station apparatus 21, 22, 23, 24, or 25, for example, the control unit 214, 234, 244, or 254, in the above-described embodiments may be realized with a computer. In this case, a program for realizing these control functions may be recorded on a computer-readable recording medium, and the mobile station apparatus may be realized by causing a computer system to read and execute the program recorded on the recording medium. Note that the "computer system" referred to here is a computer system built into the mobile station apparatus 21, 22, 23, 24, or 25, and it is assumed to include an OS and hardware such as peripheral devices. In addition, the "computer-readable recording medium" refers to a portable medium such as a flexible disk, a magneto-optical disc, ROM, CD-ROM, or the like, or a storage device such as a hard disk built into the computer system. Further, the "computer-readable recording medium" may also encompass media that briefly or dynamically retain the program, such as a communication line in the case where the program is transmitted via a network such as the Internet or a communication channel such as a telephone line, as well as media that retain the program for a given period of time, such as a volatile memory inside the computer system acting as a server or client in the above case. Moreover, the above-described program may be for realizing part of the functions discussed earlier, and may also realize the functions discussed earlier in combination with programs already recorded in the computer system.

Alternatively, part or all of the mobile station apparatus 21, 22, 23, 24, or 25 in the above-described embodiments may also be realized as an integrated circuit such as an LSI. The respective function blocks of 21, 22, 23, 24, or 25 may be realized as individual processors, or part or all thereof may be integrated into a single processor. Furthermore, the circuit integration methodology is not limited to LSI and may also be realized with dedicated circuits or general processors. In addition, if progress in semiconductor technology yields integrated circuit technology that may substitute for LSI, an integrated circuit according to that technology may also be used. At least part of the above-described user interface 216, that is, any of the sound reproduction unit, the sound collecting unit, the image display unit, the image capturing unit, and the operation input unit, or any given combinations of the above, or all of the above may be omitted from the integrated circuit.

While embodiments of this invention have been described in detail above with reference to the drawings, specific configurations are not limited to those described above, and various design changes and the like can be made within a scope that does not depart from the gist of the present invention.

INDUSTRIAL APPLICABILITY

The present invention is applicable to a mobile station apparatus, an integrated circuit, a communication method, and a communication program that are required to reduce the processing time and power consumption related to a cell search.

REFERENCE SIGNS LIST 1, 2, 3, 4 . . . communication system, 11, 12 . . . base station apparatus, 21, 22, 23, 24, 25 . . . mobile station apparatus, 212 . . . antenna, 213 . . . transmission/reception unit, 214, 234, 244, 254 . . . control unit, 2141, 2341, 2441, 2541 . . . detection threshold changing unit, 2142 . . . channel processing unit, 2143 . . . synchronization processing unit, 215 . . . memory unit, 216 . . . user interface, 232 . . . GPS antenna, 233 . . . GPS reception unit, 248 . . . voltage measuring unit, 249 . . . power supply

The invention claimed is:

1. A mobile station apparatus comprising:
    detection threshold changing circuitry that changes a detection threshold used for detecting a reception wave from a base station apparatus, on the basis of use environment information that represents a use environment of the mobile station apparatus;
    channel selecting circuitry that selects a channel having a reception level higher than the detection threshold from among channels that constitute the reception wave; and
    synchronization processing circuitry that performs a synchronization process on a reception wave of the channel selected by the channel selecting circuitry; wherein
    the use environment information includes country information regarding an area in which a network connected to the base station apparatus is operated, frequency band information that represents a frequency band that is in operation in the network connected to the base station apparatus, and location information of the mobile station apparatus;
    the detection threshold changing circuitry changes the detection threshold by using any of the country information, the frequency band information, and the location information as the use environment information; and
    the use environment information also includes carrier information regarding a carrier that operates the network connected to the base station apparatus, and the detection threshold changing circuitry changes the detection threshold also on the basis of the carrier information.

2. A mobile station apparatus comprising:
    detection threshold changing circuitry that changes a detection threshold used for detecting a reception wave from a base station apparatus, on the basis of use environment information that represents a use environment of the mobile station apparatus;
    channel selecting circuitry that selects a channel having a reception level higher than the detection threshold from among channels that constitute the reception wave;
    synchronization processing circuitry that performs a synchronization process on a reception wave of the channel selected by the channel selecting circuitry;
    storage circuitry that stores history information regarding a history of the use environment information; wherein
    the use environment information includes country information regarding an area in which a network connected to the base station apparatus is operated, frequency band information that represents a frequency band that is in operation in the network connected to the base station apparatus, and location information of the mobile station apparatus;
    the detection threshold changing circuitry changes the detection threshold by using any of the country information, the frequency band information, and the location information as the use environment information; and the history information includes a plurality of pieces of the use environment information, the detection threshold changing circuitry changes the detection threshold in accordance with individual use states of the plurality of pieces of the use environment information.

3. A mobile station apparatus comprising:

at least one processor; and at least one memory; wherein the at least one processor executes a program stored in the at least one memory to:

change a detection threshold used for detecting a reception wave from a base station apparatus, on the basis of use environment information that represents a use environment of the mobile station apparatus;

select a channel having a reception level higher than the detection threshold from among channels that constitute the reception wave; and perform a synchronization process on a reception wave of the channel selected;

the use environment information includes country information regarding an area in which a network connected to the base station apparatus is operated, frequency band information that represents a frequency band that is in operation in the network connected to the base station apparatus, and location information of the mobile station apparatus;

the detection threshold is changed by using any of the country information, the frequency band information, and the location information as the use environment information; and the use environment information also includes carrier information regarding a carrier that operates the network connected to the base station apparatus, and the detection threshold is changed also on the basis of the carrier information.

4. A mobile station apparatus, comprising:

at least one processor; and at least one memory; wherein the at least one processor executes a program stored in the at least one memory to:

change a detection threshold used for detecting a reception wave from a base station apparatus, on the basis of use environment information that represents a use environment of the mobile station apparatus;

select a channel having a reception level higher than the detection threshold from among channels that constitute the reception wave;

perform a synchronization process on a reception wave of the channel selected; and store, in the memory, history information regarding a history of the use environment information;

the use environment information includes country information regarding an area in which a network connected to the base station apparatus is operated, frequency band information that represents a frequency band that is in operation in the network connected to the base station apparatus, and location information of the mobile station apparatus;

the detection threshold is changed by using any of the country information, the frequency band information, and the location information as the use environment information; and the history information includes a plurality of pieces of the use environment information, and the detection threshold is changed in accordance with individual use states of the plurality of pieces of the use environment information.

* * * * *